US012614823B2

(12) United States Patent
Kimura et al.

(10) Patent No.: US 12,614,823 B2
(45) Date of Patent: Apr. 28, 2026

(54) PROTECTION ELEMENT AND BATTERY PACK

(71) Applicant: DEXERIALS CORPORATION, Shimotsuke (JP)

(72) Inventors: Yuji Kimura, Shimotsuke (JP); Chisato Komori, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 693 days.

(21) Appl. No.: 17/918,423

(22) PCT Filed: Apr. 15, 2021

(86) PCT No.: PCT/JP2021/015542
§ 371 (c)(1),
(2) Date: Oct. 12, 2022

(87) PCT Pub. No.: WO2021/210634
PCT Pub. Date: Oct. 21, 2021

(65) Prior Publication Data
US 2023/0146486 A1 May 11, 2023

(30) Foreign Application Priority Data
Apr. 17, 2020 (JP) ................................. 2020-074410

(51) Int. Cl.
*H01M 50/583* (2021.01)
*H01M 10/0525* (2010.01)

(52) U.S. Cl.
CPC ..... *H01M 50/583* (2021.01); *H01M 10/0525* (2013.01)

(58) Field of Classification Search
CPC ........... H01M 50/583; H01M 10/0525; H01M 10/4257; H01M 10/6571; H01M 10/058;
(Continued)

(56) References Cited

U.S. PATENT DOCUMENTS 4,053,857 A † 10/1977 Guraydin
9,025,295 B2 † 5/2015 Wang
(Continued)

FOREIGN PATENT DOCUMENTS

JP 2015225786 A 12/2015
JP 2017073288 A 4/2017
(Continued)

OTHER PUBLICATIONS

Kouchi et al., JP 2017/073288, Espacenet machine translation, 2017 (Year: 2017).*
Kimura et al., JP 2015/225786, Espacenet machine translation, 2015 (Year: 2015).*
Office Action issued Jun. 10, 2024 in Korean Patent Application No. 10-2022-7034944 (with English translation), 13 pages.
(Continued)

*Primary Examiner* — Adam A Arciero
(74) *Attorney, Agent, or Firm* — Element IP, PLC

(57) ABSTRACT
A protection element includes: an insulating substrate; a fuse element provided on the insulating substrate; a heating element to blow the fuse element; a heating element power supply electrode; a first extraction electrode leading from the heating element power supply electrode and connected to a first end of the heating element; an intermediate electrode connected to the fuse element; a heating element connecting electrode connecting the heating element and the intermediate electrode; a second extraction electrode leading from the heating element connection electrode and connected to a second end of the heating element; and an insulating layer that covers the heating element, the first extraction electrode, and the second extraction electrode, and on which the intermediate electrode is laminated. The intermediate electrode does not overlap with the first extraction electrode and overlaps with the second extraction electrode with the insulating layer interposed therebetween.

14 Claims, 31 Drawing Sheets

(58) Field of Classification Search
CPC ........ H01M 10/615; B60L 3/00; B60L 58/10;
H01H 37/76; H01H 2231/026; H02H
7/18; H02J 7/00
See application file for complete search history.

(56) References Cited

U.S. PATENT DOCUMENTS

| | | | |
|---|---|---|---|
| 10,032,583 B2 † | 7/2018 | Furuuchi |
| 10,553,387 B1 † | 2/2020 | Angelini |
| 2017/0236667 A1 † | 8/2017 | Furuuchi |

FOREIGN PATENT DOCUMENTS

| | | | |
|---|---|---|---|
| JP | 2018078046 A | 5/2018 |
| JP | 2018156959 A | 10/2018 |
| TW | 201809647 A | 3/2018 |

OTHER PUBLICATIONS

Written Opinion issued Jul. 6, 2021 in PCT/JP2021/015542 (with English translation), 10 pages.
International Search Report issued Jul. 6, 2021 in PCT/JP2021/015542 (with English translation), 5 pages.
Combined Taiwanese Office Action and Search Report issued Oct. 1, 2024 in corresponding Taiwanese Patent Application No. 110113741 (with machine English translation), 14 pages.
Office Action issued Oct. 3, 2023 in Japanese Patent Application No. 2020-074410 (with English translation), 10 pages.
Combined Chinese Office Action and Search Report issued Aug. 1, 2025, in corresponding Chinese Patent Application No. 202180027923.4 (with machine English translation), 21 pages.
"Spark Gap," Wikipedia, Wikimedia Foundation, https://en.wikipedia.org/wiki/Spark_gap, retrieved Jul. 4, 2023, 6 pages.†

\* cited by examiner
† cited by third party (C)

(A)

(B)

Q – Q'

(A)

(B)

P–P'

<u>100</u>

30

Q – Q'

(A)

(B)

R – R'

40

50

Q – Q'

50

(A)

(B)

(C)

(A)

(B)

Q – Q'

60

60

(A)

(B)

R – R'

(A)

(B)

A –A'

(A)

(B)

A –A'

(A)

A -A'

(B)

(A)

A –A'

(B)

(C)

(A)

(B)

PROTECTION ELEMENT AND BATTERY PACK

TECHNICAL FIELD

This technology relates to a protection element that protects a circuit connected on a current path by fusing the current path and to a battery pack that uses the protection element. This application claims priority based on Japanese Patent Application No. 2020-74410 filed on Apr. 17, 2020 in Japan, and this application is hereby incorporated by reference.

BACKGROUND TECHNOLOGY

Most secondary batteries that can be charged and used repeatedly are formed into battery packs and provided to users. In particular, lithium ion secondary batteries with high energy density by weight generally have several protection circuits for overcharge protection, over-discharge protection, and the like, integrated into the battery pack with a function of cutting off battery pack output in particular cases to ensure the safety of the user and the electronic device.

A lot of electronic devices that use lithium ion secondary batteries perform battery pack overcharge protection or over-discharge protection operation by turning an FET switch built-in to the battery pack ON/OFF. However, even in the case where the FET switch is destroyed by a short circuit due to some cause, a lightning surge is applied and an instantaneous overcurrent flows, or output voltage is abnormally low or on the other hand excessive overvoltage is output as the battery cell reaches end of life, the battery pack or the electronic device is required to be protected from ignition or other accidents. Here, a protection element containing a fuse element having a function of cutting off a current path based on an external signal is used to safely cut off battery cell output even in such various abnormal circumstances that can be considered.

As such a protection element of a protective circuit for lithium ion secondary batteries and the like, a structure with a heating element in the protection element is used to fuse a fusible conductor in the electric current path by heat generated by the heating element.

Applications for lithium ion secondary batteries have become widespread in recent years and applications with large currents such as power tools including an electric screwdriver, hybrid vehicles, electric vehicles, transport equipment such as power-assisted bicycles, storage batteries, and the like are being investigated and some of which have started to be used. In these types of applications, a large current, ranging from several tens of amperes to over one hundred amperes, may flow during startup. To realize a protection element that can handle such a large current capacity is desired.

A protection element in which a fusible conductor with increased cross-sectional area is used and this fusible conductor is connected on the surface of an insulating substrate with a heating element formed thereon, has been proposed to implement a protection element that can handle such a large current.

FIG. 27 is a diagram illustrating a configuration example of a conventional protection element where (A) is a plan view with the cover member omitted, (B) is a cross-sectional view, and (C) is a bottom view. A protection element 100 illustrated in FIG. 27 includes an insulating substrate 101, first and second electrodes 102 and 103 formed on the surface of the insulating substrate 101, a heating element 104 formed on the surface of the insulating substrate 101, an insulating layer 105 that covers the heating element 104, an intermediate electrode 106 laminated on the insulating layer 105 and connected to the heating element 104, and a fuse element 107 mounted across the first electrode 102, the intermediate electrode 106, and the second electrode 103 via connecting solder.

The first and second electrodes 102 and 103 are terminals connected on the current path of the external circuit connected by the protection element 100. The first electrode 102 is connected to a first external connecting electrode 102a formed on the back surface of the insulating substrate 101 via a castellation and the second electrode 103 is connected to a second external connecting electrode 103a formed on the back surface of the insulating substrate 101 via a castellation. With regards to the protection element 100, by connecting the first and second external connecting electrodes 102a and 103a to connecting electrodes provided on the external circuit board that the protection element 100 is mounted on, the fuse element 107 is integrated as a part of the current path formed on the external circuit board.

The heating element 104 is a conductive member that has a relatively high resistance value and generates heat when energized, and is composed of a material such as nichrome, W, Mo, Ru, or the like or a material containing these materials. In addition, the heating element 104 is connected to the heating element power supply electrode 108 formed on the surface of the insulating substrate 101. The heating element power supply electrode 108 is connected to a third external connecting electrode 108a formed on the back surface of the insulating substrate 101 via castellation. In the protection element 100, the third external connecting electrode 108a is connected to a connection electrode provided on an external circuit board on which the protection element 100 is mounted, thereby the heating element 104 is connected to an external power source provided in an external circuit. Furthermore, the current and heat generation of the heating element 104 are continuously controlled by a switch element (not shown) or the like.

The heating element 104 is covered with an insulating layer 105 composed of a glass layer or the like and overlaps with the intermediate electrode 106 with the insulating layer 105 interposed therebetween by forming the intermediate electrode 106 on the insulating layer 105. In addition, a fuse element 107 which is connected over the first and second electrodes 102 and 103, is connected on the intermediate electrode 106.

Thus, in the protection element 100, the heating element 104 and the fuse element 107 are overlapped, thereby thermally connected, enabling to blow the fuse element 107 by heat generation through energizing of the heating element 104.

The fuse element 107 is formed using a low melting point metal such as Pb free solder or a high melting point metal such as Ag, Cu or an alloy having one of these as a main component or has a multilayer structure of a low melting point metal and a high melting point metal. Furthermore, by connecting from the first electrode 102 across the intermediate electrode 106 and to the second electrode 103, the fuse element 107 constitutes a part of the external circuit current path that the protection element 100 is incorporated into. Furthermore, the fuse element 107 blows from self-heating (Joule heat) when a current exceeding the rated value thereof is applied or is blown by heat generation of the heating element 104, and cuts off the first and second electrodes 102, 103.

Furthermore, when the external circuit current path needs to be cut off, the protection element 100 energizes the heating element 104 using a switch element. Thus, in the protection element 100, the heating element 104 generates heat causing a high temperature and blows the fuse element 107 incorporated in the external circuit current path. The fuse conductor of the fuse element 107 is led to the intermediate electrode 106 with high wettability and to the first and second electrodes 102, 103 and blows the fuse element 107. Therefore, the protection element 100 causes blowing of the first electrode 102 to the intermediate electrode 106 to the second electrode 103 enabling cutting off the electric current path of the external circuit.

Note that for the protection element, in addition to the configuration illustrated in FIG. 27, a configuration having two heating elements 104 as illustrated in FIG. 28 has also been proposed. A protection element 110 illustrated in FIG. 28 has two heating elements 104 provided in parallel between the first and second electrodes 102, 103 on the surface of the insulating substrate 101. Each heating element 104 is covered by the insulating layer 105 and the intermediate electrode 106 provided on the insulating layer 105 is formed superimposed across both heating elements 104.

In addition, with the protection element 110 illustrated in FIG. 28, a retention electrode 111 is formed on the back surface of the insulating substrate 101 and a plurality of through holes 112 are provided between the intermediate electrode 106 and retention electrode 111. The retention electrode 111 and through holes 112 draw the fuse conductor of the fuse element 107 melted on the intermediate electrode 106 and increase the retention capacity of the fuse conductor of the fuse element 107 increased in size in accordance with a large current application and a conductive layer is formed on the inner surface of the through holes 112.

CITATION LIST

Patent Documents

Patent Document 1: Japanese Unexamined Patent Application 2018-78046

Patent Document 2: Japanese Unexamined Patent Application 2018-156959

SUMMARY OF THE INVENTION

Problem to be Solved by the Invention

In a conventional configuration such as the protection element 100 illustrated in FIG. 27 and the protection element 110 illustrated in FIG. 28, if used in a protection circuit of a lithium ion secondary battery for a large current application, the lithium ion secondary battery of the large current application is used as the external power source that supplies power to the heating element 104 so an over voltage is applied to the heating element power supply electrode 108 when the protection element 100 activates.

Therefore, as illustrated in FIG. 29, with the protection element 100, there are cases where a spark (discharge) is generated from the heating element power supply electrode 108 to the tip of the intermediate electrode 106, damaging the intermediate electrode 106. Furthermore, if the intermediate electrode 106 is damaged, the thermal conductivity of the damaged location to the fuse element 107 is lowered extending the time until the fuse element 107 is blown, potentially preventing rapid and safe cutting off of the current path.

In addition, as illustrated in FIG. 30, with the protection element 110, if a spark is generated from the heating element power supply electrode 108 to the tip of the intermediate electrode 106, damaging the intermediate electrode 106, the thermal conductivity of the damaged location to the fuse element 107 is lowered, extending the time until the fuse element 107 is blown, potentially preventing rapid and safe cutting off of the current path. In addition, the insulating layer (glass layer) 105 is formed with a thin 10 to 40 μm thickness to enable efficient transfer of heat in the heating element 104 to the intermediate electrode 106 and fuse element 107, therefore damage may occur thereto if the heat in the heating element 104 is applied for a long period. Furthermore, as illustrated in FIG. 31, a spark may be generated from the high potential side of the heating element 104 to the center portion of the intermediate electrode 106 in the damaged area of the insulating layer 105. If the intermediate electrode 106 is damaged in this manner, due to the damage of the intermediate electrode 106 in addition to the damage of the insulating layer 105, thermal conductivity to the fuse element 107 is lowered, extending the time until the fuse element 107 can be blown, potentially preventing rapid and safe cutting off of the current path.

The risk that the fuse element will remain unmelted due to electrode damage associated with this type of spark, and hinder current cut off, increases with increased fuse element size in conjunction with higher voltage and higher current as well as with increased current rated value and stronger electric fields, with closer proximity of the heating element power supply electrode 108 and the intermediate electrode 106 associated with reduced size of the protection element, and with reduced thickness of the insulating layer.

Therefore, in protection elements with built-in heating elements, there is a demand to handle high voltage and high current, and to provide measures to prevent electrode breakdown in the element, enabling rapid and safe operation.

Here, an object of the present technology is to provide a protection element that can cut off a current path safely and rapidly with less likely causing a spark when high voltage is applied, and a battery pack that uses this protection element.

Means to Solve the Problem

To resolve the problems described above, a protection element according to the present technology, includes:

an insulating substrate;

a fuse element provided on a first surface of the insulating substrate;

a heating element formed on the first surface of the insulating substrate that blows the fuse element by generating heat;

a heating element power supply electrode formed on the first surface of the insulating substrate that supplies current to the heating element for heat generation;

a first extraction electrode leading from the heating element power supply electrode and connected to a first end of the heating element;

an intermediate electrode in contact with the fuse element;

a heating element connecting electrode formed on the first surface of the insulating substrate between the heating element and the intermediate electrode, connecting the heating element and the intermediate electrode;

a second extraction electrode leading from the heating element connection electrode and connected to a second end of the heating element; and an insulating layer that covers the heating element, the first extraction electrode, and the second extraction electrode, and upon which the intermediate electrode is laminated; wherein the intermediate electrode does not overlap with the first extraction electrode and does overlap with the second extraction electrode with the insulating layer.

In addition, a battery pack according to the present technology, includes:

one or more battery cells;

a protection element connected on the charging/discharging path of the battery cell to blow the charging/discharging path; and a current control element that detects the battery cell voltage value and controls protection element energization; wherein the protection element includes:

an insulating substrate;

a fuse element provided on a first surface of the insulating substrate;

a heating element formed on the first surface of the insulating substrate that blows the fuse element by generating heat;

a heating element power supply electrode formed on the first surface of the insulating substrate that supplies current to the heating element for heat generation;

a first extraction electrode leading from the heating element power supply electrode and connected to a first end of the heating element;

an intermediate electrode in contact with the fuse element;

a heating element connecting electrode formed on the first surface of the insulating substrate between the heating element and the intermediate electrode, connecting the heating element and the intermediate electrode;

a second extraction electrode leading from the heating element connection electrode and connected to a second end of the heating element; and an insulating layer that covers the heating element, the first extraction electrode, and the second extraction electrode, and upon which the intermediate electrode is laminated; wherein the intermediate electrode does not overlap with the first extraction electrode and overlaps with the second extraction electrode via the insulating layer.

Effect of the Invention

With the present technology, along with leading the first extraction electrode from the heating element power supply electrode to which a high voltage is applied, the intermediate electrode does not overlap with the first extraction electrode but does overlap with the second extraction electrode; therefore, the intermediate electrode is formed in a position separated from the first extraction electrode. Thus, a discharge path between the first extraction electrode which is a high-potential portion and the intermediate electrode which is a low-potential portion is not readily formed; therefore, a spark is less likely to occur. Therefore, the insulating layer and the intermediate electrode are not damaged, the thermal conductivity to the fuse element is maintained, the fuse element can be blown quickly, and the electric current path can be cut off safely.

DESCRIPTION OF THE EMBODIMENTS

A protection element and battery pack to which the present technology is applied are described in detail below with reference to the figures. Note that the present technology is not limited to the following Embodiments, but various modifications can be made within the scope that do not deviate from the gist of the present technology. Also, the drawings are schematic, and the proportions and the like of each dimension may defer from reality. Specific dimensions and the like should be determined with reference to the following description. In addition, needless to say, the drawings also include portions where the dimensions and proportions differ from each other.

Embodiment 1

Figure 1:
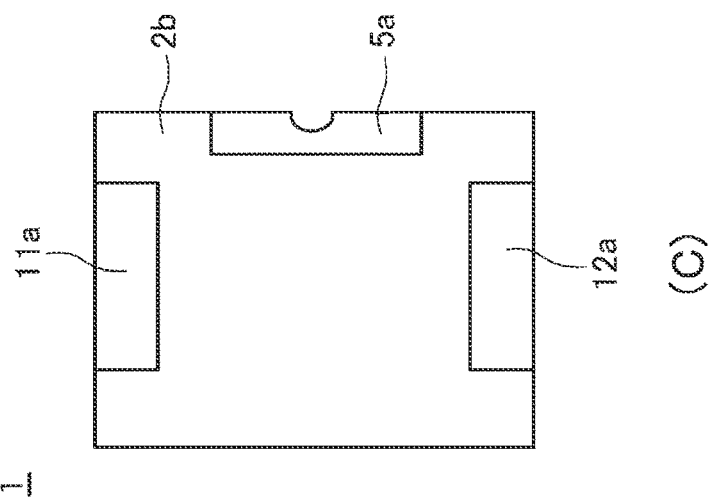
FIG. 1 illustrates Embodiment 1 of a protection element where the present technology was applied. (A) is a plan view, (B) is a cross-sectional view, and (C) is a bottom view.
Figure 1:
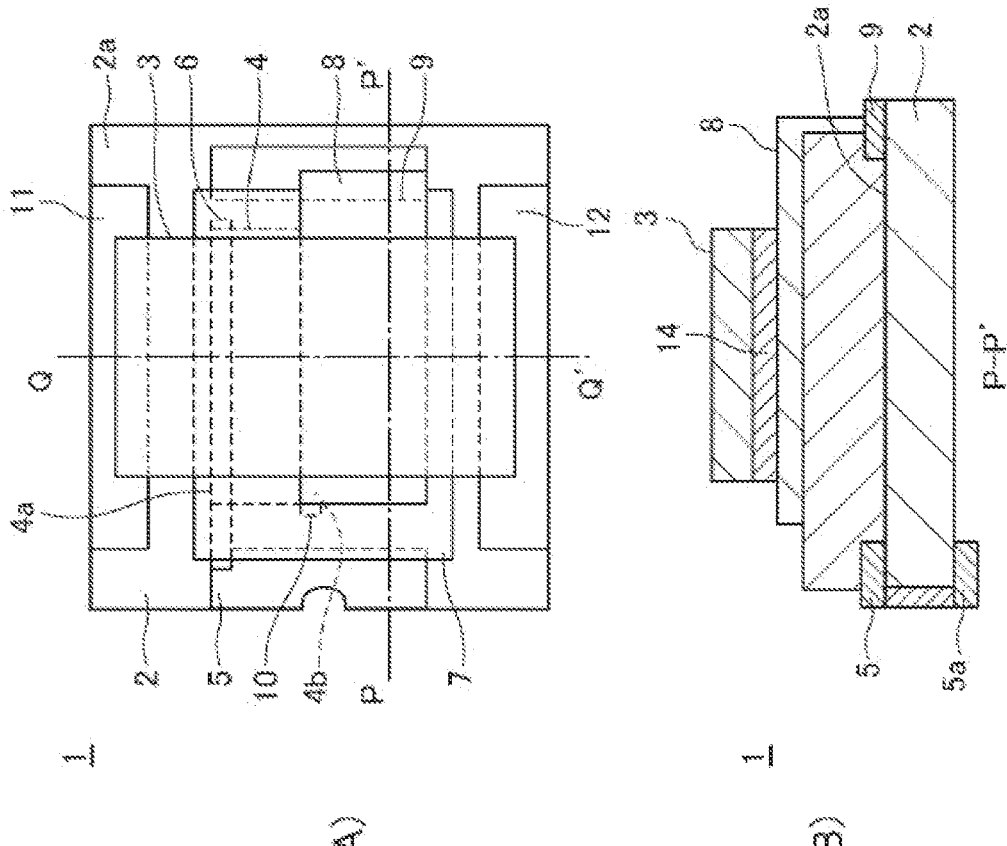
Figure 2:
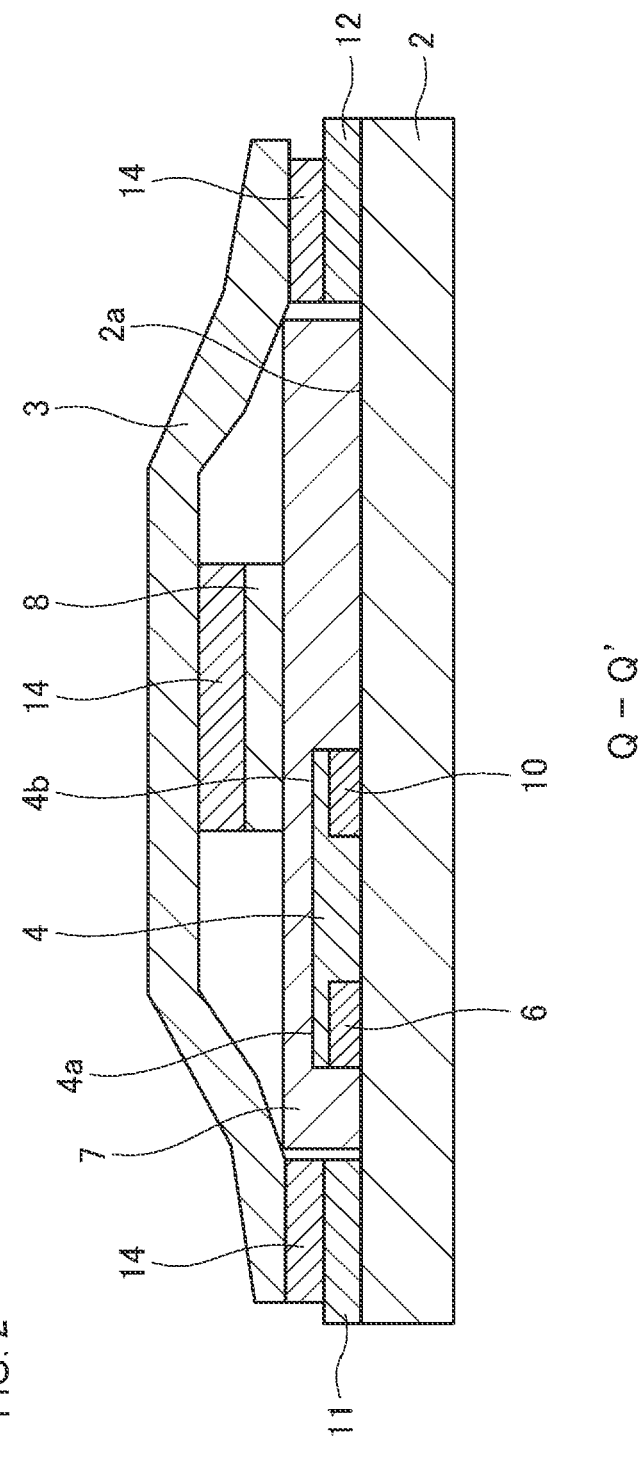
FIG. 2 is a cross-sectional view of the protection element according to Embodiment 1.

Embodiment 1 of the protection element to which the present technology is applied is described. A protection element 1, as illustrated in FIG. 1 (A) through (C) and FIG. 2, includes: an insulating substrate 2, a fuse element 3 provided on a front surface 2a side of the insulating substrate 2, a heating element 4 formed on the front surface 2a side of the insulating substrate 2 blowing the fuse element 3 by generating heat, a heating element power supply electrode 5 formed on the front surface 2a side of the insulating substrate 2 to which the electric current to heat the heating element 4 is supplied, a first extraction electrode 6 led from the heating element power supply electrode 5 and connected to a first end 4a of the heating element 4, an intermediate electrode 8 on the fuse element 3 mounted, a heating element connecting electrode 9 formed between the heating element 4 and the intermediate electrode 8 on the front surface 2a side of the insulating substrate 2 connecting the heating element 4 and the intermediate electrode 8, a second extraction electrode 10 led from the heating element connecting electrode 9 and connected to a second end 4b of the heating element 4, and an insulating layer 7 covering the heating element 4, the first extraction electrode 6, and the second extraction electrode 10, and onto which the intermediate electrode 8 is laminated.

Furthermore, as illustrated in FIG. 1(A), in the protection element 1, the intermediate electrode 8 does not overlap with the first extraction electrode 6 but does overlap with the second extraction electrode 10 in plan view. With the protection element 1, when the heating element 4 is energized by the heating element power supply electrode 5, the first extraction electrode 6 led from the heating element power supply electrode 5 becomes high potential with respect to the second extraction electrode 10, and the second extraction electrode 10 becomes low potential. As a result, even when a high voltage is applied to the protection element 1, a spark (discharge) is unlikely to occur, and an electric current path can be shut off safely and quickly. This may be due to the following reason.

In other words, a spark is an event in which a large electric current flows instantaneously due to a dielectric breakdown occurring from a high-potential portion to a low-potential portion between electrodes facing each other with an insulating layer interposed therebetween. The heating element power supply electrode 5 connected to an external power source and applying a high voltage to the heating element 4 and the first extraction electrode 6 led therefrom are at a higher electric potential than the heating element connecting electrode 9 connected to the intermediate electrode 8 and the second extraction electrode 10 led therefrom. The heating element connecting electrode 9 does not supply electric current to the heating element 4.

In the protection element 1, along with leading the first extraction electrode 6 from the heating element power supply electrode 5 to which a higher voltage is applied, in plan view, the intermediate electrode 8 does not overlap with the first extraction electrode 6 but does overlap with the second extraction electrode 10; therefore, the intermediate electrode 8 is formed in a position separated from the first extraction electrode 6. Thus, a discharge path between the first extraction electrode 6 which is a high-potential portion and the intermediate electrode 8 which is a low-potential portion is not readily formed; therefore, a spark is less likely to occur. Therefore, the insulating layer 7 and the intermediate electrode 8 are not damaged, the thermal conductivity to the fuse element 3 is maintained, the fuse element 3 can be blown quickly, and the electric current path can be cut off safely.

Furthermore, with the protection element 1 illustrated in FIG. 1, the intermediate electrode 8 overlaps with the second extraction electrode 10, so that the intermediate electrode 8 and the second extraction electrode 10 are thermally connected through the insulating layer 7, enabling efficient heating of the intermediate electrode 8 and the fuse element 3 mounted thereon. Therefore, the fuse element 3 can be blown quickly after electric current is applied to the heating element 4.

By incorporating such protection element 1 in an external circuit, the fuse element 3 constitutes a part of the electric current path of the external circuit, and upon being blown by heat generation by the heating element 4 or an overcurrent exceeding the rated value, the electric current path is shut off. Each configuration of the protection element 1 is described in detail below.

Insulating Substrate

The insulating substrate 2 is composed of an insulating material such as alumina, glass ceramics, mullite, zirconia, and the like. In addition, a material used for a printed wiring board, such as a glass epoxy substrate and a phenolic substrate may be used for the insulating substrate 2.

First and second electrodes 11 and 12 are formed on opposite ends of the insulating substrate 2. The first and second electrodes 11 and 12 are each formed of an electrically conductive pattern of Ag, Cu, or the like. In addition, the surfaces of the first and second electrodes 11 and 12 are preferably coated with a film such as Ni/Au plating, Ni/Pd plating, or Ni/Pd/Au plating by a known method such as plating treatment. Thus, the protection element 1 can prevent oxidation of the first and second electrodes 11 and 12 and prevent fluctuations in ratings caused by an increase in conduction resistance. In addition, erosion of the first and second electrodes 11, 12 (solder erosion) caused by melting of the solder for connecting the fuse element 3, can be prevented for the case in which the protection element 1 is reflow mounted.

In addition, the first and second electrodes 11 and 12 on the front surface 2*a* of the insulating substrate 2 are connected to first and second external connecting electrodes 11*a* and 12*a* formed on a back surface 2*b* via a castellation. With the protection element 1, by connecting the first and second external connecting electrodes 11*a* and 12*a* formed on the back surface 2*b* of the insulating substrate 2 to connection electrodes provided on an external circuit board on which the protection element 1 is mounted, the fuse element 3 is incorporated into a part of the electric current path formed on the circuit board.

Figure 3:
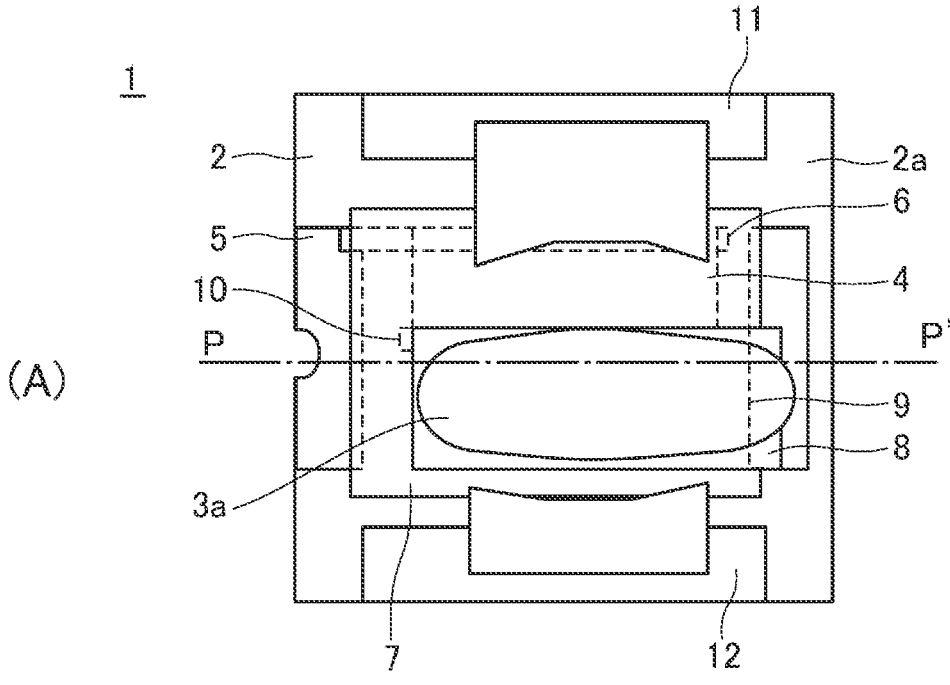
FIG. 3 illustrates a fuse element blown in the protection element according to Embodiment 1. (A) is a plan view, and (B) is a cross-sectional view.
Figure 3:
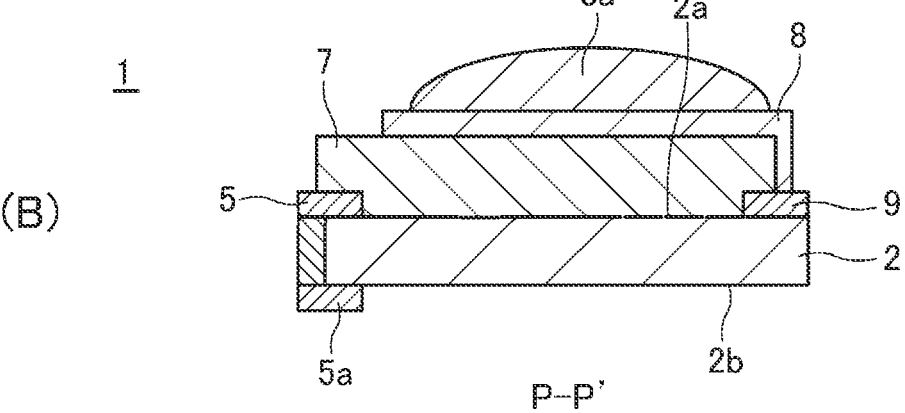

The first and second electrodes 11 and 12 are electrically connected by mounting the fuse element 3 with a conductive connection material such as connecting solder 14. Also, as illustrated in FIGS. 3 (A) and (B), the first and second electrodes 11 and 12 are cut off by flowing a large current exceeding the rated value in the protection element 1, causing the fuse element 3 to blow due to self-heating (Joule heat), or by generating heat in the heating element 4 associated with being energized, causing the fuse element 3 to blow.

Heating Element

The heating element 4 is a conductive member that has a relatively high resistance value and generates heat when energized, and is composed of a material such as nichrome, W, Mo, Ru, or the like or a material containing these materials. The heating element 4 can be formed by mixing powders of these alloys, compositions, or compounds with a resin binder or the like to obtain a paste, forming a pattern of the paste on the insulating substrate 2 with a screen printing technology, and calcining or the like. As an example, the heating element 4 can be formed by adjusting a mixed paste of ruthenium oxide paste, silver, and glass paste according to a prescribed voltage, forming a film in a prescribed position and prescribed surface area on the front surface 2*a* of the insulating substrate 2, then, performing a calcining treatment under appropriate conditions. The form of the heating element 4 can be suitably designed, but as illustrated in FIG. 1, forming a substantially rectangular shape in accordance with the shape of the insulating substrate 2 is preferable in order to maximize the heating area.

The heating element 4 has a first end 4*a* connected to the first extraction electrode 6 and a second end 4*b* connected to the second extraction electrode 10. The first extraction electrode 6 is led from the heating element power supply electrode 5, and has the same potential as the heating element power supply electrode 5 when the heating element 4 is energized. The second extraction electrode 10 is led from the heating element connecting electrode 9, and has the same potential as the heating element connecting electrode 9 when the heating element 4 is energized. The first extraction electrode 6 is led from the heating element power supply electrode 5 along the first end 4*a* of the heating element 4, and in the protection element 1 illustrated in FIG. 1, extends along a first side edge of the heating element 4 formed in a substantially rectangular shape, and the first side edge of the heating element 4 overlaps therewith. Likewise, the second extraction electrode 10 is led from the heating element connecting electrode 9 along the second end 4*b* of the heating element, and in the protection element 1 illustrated in FIG. 1, extends along the second side edge of the heating element 4 formed in a substantially rectangular shape, and the second side edge of the heating element 4 overlaps therewith.

The heating element power supply electrode 5 and heating element connecting electrode 9 are formed on opposite side edges of the insulating substrate 2 different from the side edges where the first and second electrodes 11 and 12 are provided. The heating element power supply electrode 5 is an electrode that is connected to the first end 4*a* of the heating element 4 and serves as a power supply terminal to the heating element 4, and is continuous with a third external connection electrode 5*a* formed on the back surface 2*b* of the insulating substrate 2 via a castellation. In addition, the intermediate electrode 8 is connected to the heating element connecting electrode 9.

Also, the heating element 4, the first extraction electrode 6 and the second extraction electrode 10 are covered with an insulating layer 7. The intermediate electrode 8 is formed on the insulating layer 7. The intermediate electrode 8 is connected to the fuse element 3 between the first and second electrodes 11 and 12 via a bonding material such as connecting solder 14 or the like.

The insulating layer 7 is provided to protect and insulate the heating element 4 and efficiently transmit the heat of the heating element 4 to the intermediate electrode 8 and the fuse element 3, and is composed of, for example, a glass layer. The insulating layer 7 is formed thin with a thickness of, for example, 10 to 40 μm in order to efficiently transmit heat of the heating element 4 to the intermediate electrode 8 and the fuse element 3. The insulating layer 7 may, for example, be formed by coating a glass-based paste.

By mounting the protection element 1 on the external circuit board, the heating element 4 is connected to a current control element or the like formed in the external circuit via the third external connection electrode 5*a*, and normally this regulates electric conduction and heat generation. Furthermore, the heating element 4 is energized via the third external connection electrode 5*a* and generates heat at a prescribed timing to shut off the electric conduction path of the external circuit. Herein, with the heating element 4, the heating element power supply electrode 5 and the first extraction electrode 6 side is the high-potential portion, and the heating element connecting electrode 9, the second extraction electrode 10, and the intermediate electrode 8 side is the low-potential portion. The protection element 1 can blow the fuse element 3 connecting the first and second electrodes 11 and 12 by transmitting the heat of the heating element 4 to the fuse element 3 through the insulating layer 7 and the intermediate electrode 8. A fused conductor 3*a* of the fuse element 3 aggregates on the intermediate electrode 8 and on the first and second electrodes 11 and 12, thereby cutting off the electric current path between the first and second electrodes 11 and 12. Note, as will be described later, when the fuse element 3 is blown, the heating element 4 stops generating heat as the electric conduction path thereof is also shut off.

In addition, the heating element power supply electrode 5 may be provided with a restricting wall to prevent the connection solder provided on the electrode of the external circuit board connected to the third external connection electrode 5*a* melted due to reflow-mounting and the like, from rising up the heating element power supply electrode 5 via the castellation and wet-spreading over the heating element power supply electrode 5. Similarly, the first and second electrodes 11 and 12 may also be provided with a restricting wall. The restricting wall can be formed using an insulating material that does not have wettability to the solder, such as glass, solder resist, or insulating adhesive, and can be formed on the heating element power supply electrode 5 by printing or the like. By providing the restricting wall, preventing the molten connection solder from wet-spreading to the heating element power supply electrode 5 and maintaining the connectivity between the protection element 1 and the external circuit board is possible.

In addition, in the protection element 1, the heating element 4 may be formed within the insulating layer 7, by forming the heating element power supply electrode 5, the first extraction electrode 6, the second extraction electrode 10, the heating element connecting electrode 9, and the heating element 4 after forming the insulating layer 7 on the front surface 2a of the insulating substrate 2, and by further forming the insulating layer 7 thereon.

Intermediate Electrode

Similar to the first and second electrodes 11 and 12, the intermediate electrode 8 is formed of a conductive pattern such as Ag, Cu, or the like. In addition, the surface of the intermediate electrode 8 is preferably coated with a film such as Ni/Au plating, Ni/Pd plating, or Ni/Pd/Au plating by a known method such as plating treatment.

The intermediate electrode 8 has the first end connected to the heating element connecting electrode 9, is formed on the insulating layer 7, and partially overlaps the heating element 4 with the insulating layer 7 interposed therebetween. As described above, in plan view, the intermediate electrode 8 does not overlap the high-potential first extraction electrode 6 positioned on the upstream side of the heating element 4 in the electric current flow direction when energized, but overlaps the low-potential second extraction electrode 10 positioned on the downstream side of the heating element 4 in the electric current flow direction. As a result, in the protection element 1, forming of a discharge path between the first extraction electrode 6 which is the high-potential portion and the intermediate electrode 8 which is a low-potential portion becomes difficult, thereby a spark (discharge) is less likely to occur even if high voltage is applied from an external circuit, and the electric current path can be cut off safely and quickly.

Furthermore, in the protection element 1 illustrated in FIG. 1, by the intermediate electrode 8 overlapping the second extraction electrode 10 which overlaps the second end 4b of the heating element 4, through the second extraction electrode 10 and the insulating layer 7, the intermediate electrode 8 and the heating element 4 are thermally connected. Thereby, the intermediate electrode 8 and the fuse element 3 mounted thereon can be efficiently heated. Therefore, the fuse element 3 can be blown quickly after electric current is applied to the heating element 4.

Fuse Element

Next, the fuse element 3 is described. The fuse element 3 is mounted across the first and second electrodes 11 and 12, and is blown by heat generation of the heating element 4 when energized or by self-heating (Joule heat) when electric current exceeding the rated value flows, and cuts off the electric current path between the first electrode 11 and the second electrode 12.

The fuse element 3 may be any conductive material that melts due to heat generated by the heating element 4 or because of an overcurrent state, and, for example, Sn—Ag—Cu base Pb-free solder, Bi—Pb—Sn alloy, Bi—Pb alloy, Bi—Sn alloy, Sn—Pb alloy, Pb—In alloy, Zn—Al alloy, In—Sn alloy, Pb—Ag—Sn alloy, and the like can be used.

Figure 4:
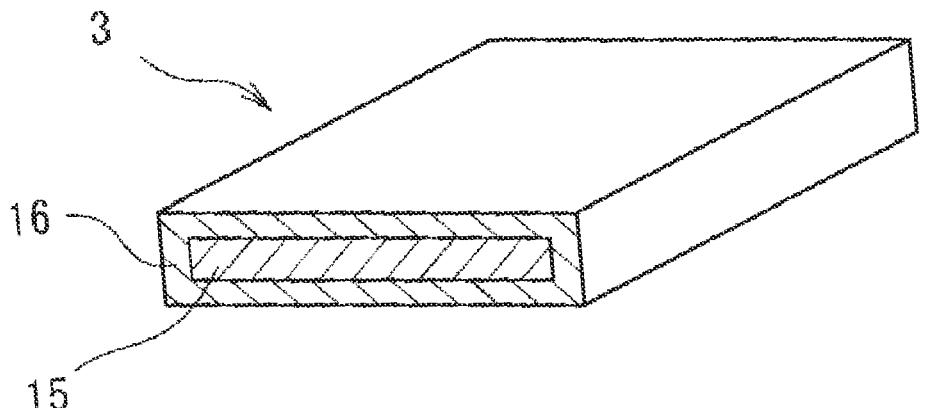
FIG. 4 is an overview diagram of the fuse element.

Further, the fuse element 3 may be a structure containing a high melting point metal and a low melting point metal. For example, as illustrated in FIG. 4, the fuse element 3 is a laminated structure composed of an inner layer and an outer layer, having a low melting point metal layer 15 as the inner layer and a high melting point metal layer 16 as the outer layer laminated on the low melting point metal layer 15. The fuse element 3 is connected onto the first and second electrodes 11 and 12 and the intermediate electrode 8 via a bonding material such as a connecting solder 14 or the like.

The low melting point metal layer 15 is preferably solder or a metal with Sn as a main component, and is a material generally called "Pb-free solder." The melting point of the low melting point metal layer 15 does not necessarily need to be higher than the temperature of the reflow furnace, and may melt at about 200° C. The high melting point metal layer 16 is a metal layer laminated on the surface of the low melting point metal layer 15, and is, for example, Ag or Cu, or a metal containing one of these as a main component and has a high melting point that does not melt even if a reflow process is used when the first and second electrodes 11 and 12 and the intermediate electrode 8 are connected to the fuse element 3 or when the protection element 1 is mounted on the external circuit board.

Such a fuse element 3 can be formed by forming a high melting point metal layer on a low melting point metal foil using a plating technique, or by using other known lamination techniques or film-forming techniques. In this case, the fuse element 3 may have a structure in which the entire surface of the low melting point metal layer 15 is covered with the high melting point metal layer 16, or may have a structure in which all except for a pair of opposing side surfaces are covered. The fuse element 3 may have the high melting point metal layer 16 laminated as an inner layer and the low melting point metal layer 15 as an outer layer, and can also be formed in various configurations, such as a multi-layered structure having three or more layers in which the low melting point metal layer 15 and high melting point metal layer 16 are alternately laminated, having an opening provided in a part of the outer layer to expose a part of the inner layer, and the like.

By laminating a low melting point metal layer 15 as an inner layer and a high melting point metal layer 16 as an outer layer, even when the reflow temperature exceeds the melting temperature of the low melting point metal layer 15, the fuse element 3 can retain the form as the fuse element 3, and does not blow. Therefore, the connection between the first and second electrodes 11 and 12 and the intermediate electrode 8 with the fuse element 3 and the mounting of the protection element 1 on the external circuit board can be efficiently performed using a reflow process. In addition, even with the reflow process, fluctuation in the blowout process such as not being blown at a prescribed temperature or being blown at less than a prescribed temperature due to locally increased or decreased resistance because of deformation of the fuse element 3 can be prevented.

In addition, the fuse element 3 does not blow due to self-heating while a prescribed rated current is flowing. Furthermore, the fuse element will melt due to self-heating when an electric current higher than the rated electric current flows, and this cuts off the electric current path between the first and second electrodes 11 and 12. In addition, the fuse element will melt due to heat generation when the heating element 4 is energized and this cuts off the electric current path between the first and second electrodes 11 and 12.

Herein, regarding the fuse element 3, erosion (solder erosion) of the high melting point metal layer 16 by the melted low melting point metal layer 15 causes the high melting point metal layer 16 to dissolve at a temperature that is lower than the melting point thereof. Therefore, the fuse element 3 can be blown in a short time by utilizing the erosion action of the high melting point metal layer 16 by the low melting point metal layer 15. In addition, since the fused conductor 3a of the fuse element 3 is separated by the physical retraction of the intermediate electrode 8 and the first and second electrodes 11 and 12, the electric current path between the first and second electrodes 11 and 12 can be cut off quickly and securely (FIG. 3).

In addition, in the fuse element 3, forming of the volume of the low melting point metal layer 15 larger than the volume of the high melting point metal layer 16 is preferable. The fuse element 3 is heated by self-heating due to overcurrent or by heat generation of the heating element 4, and melting of the low melting point metal eroding the high melting point metal causes speedy meltdown and blowout. Therefore, in the fuse element 3, by forming the volume of the low melting point metal layer 15 larger than the volume of the high melting point metal layer 16, this erosion action is promoted, and the path between the first and second external connecting electrodes 11 and 12 is quickly cut off.

In addition, since the fuse element 3 is constructed by laminating the high melting point metal layer 16 on the low melting point metal layer 15 as an inner layer, the blowout temperature can be significantly reduced compared to a conventional chip fuse containing high melting point metal. Therefore, the fuse element 3 can have a larger cross-sectional area than a chip fuse or the like of the same size, and can greatly improve the electric current rating. In addition, it can be formed smaller and thinner than a conventional chip fuse with the same current rating, and can be attained with superior rapid blowout performance.

In addition, the fuse element 3 can improve resistance to surges (pulse resistance) in which an abnormally high voltage is instantaneously applied to the electrical system with the protection element 1 incorporated. In other words, the fuse element 3 must not blow out even when a current of 100 A flows for several milliseconds. In this regard, since a large current that flows in an extremely short time flows through the surface layer of the conductor (skin effect), and because the fuse element 3 is provided with a high melting point metal layer 16 such as Ag plating having a low resistance value as an outer layer, the electric current applied by a surge can flow easily, and blowout due to self-heating can be prevented. Therefore, the fuse element 3 can significantly improve resistance to a surge compared with a conventional fuse made of solder alloys.

The fuse element 3 may be coated with flux (not illustrated) to prevent oxidation and improve wettability during fusing. The inside of the protection element 1 is protected by covering the insulating substrate 2 with a case (not illustrated). The case can be formed, for example, using members having insulating properties such as various engineering plastics, thermoplastics, ceramics, and glass epoxy substrates. In addition, the case has enough internal space to accommodate the fuse element 3 expanding into a spherical shape when blowing out on the front surface 2a of the insulating substrate 2 and the fused conductor 3a aggregating on the intermediate electrode 8 and the first and second electrodes 11 and 12.

Circuit Configuration Example

Figure 5:
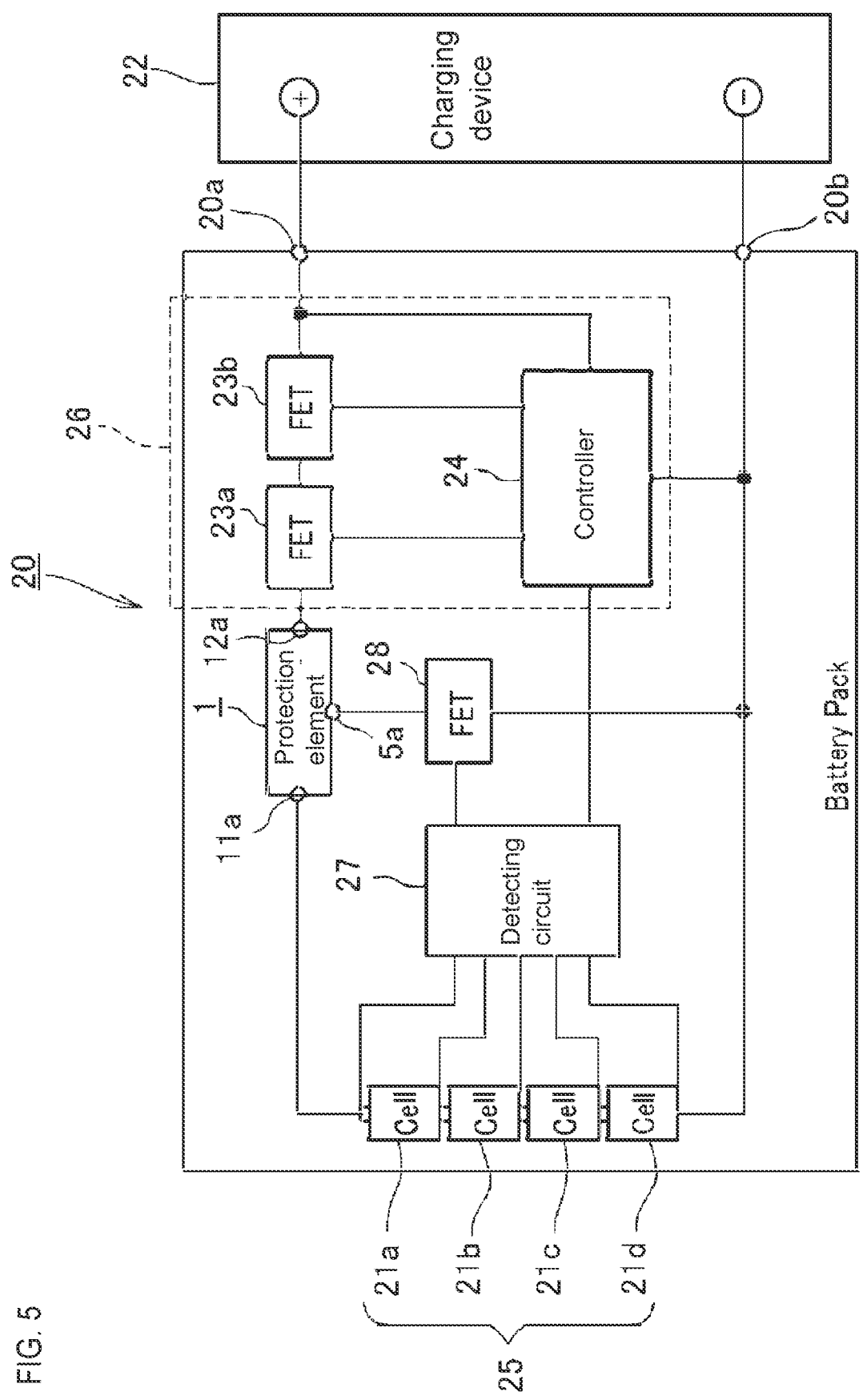
FIG. 5 is a circuit diagram illustrating an exemplary configuration of a battery pack.

Such protection element 1 is used by integrating in a circuit in a battery pack 20 of, for example, a lithium ion secondary battery. As illustrated in FIG. 5, the battery pack 20 has a battery stack 25 constituted of, for example, a total of four battery cells 21a through 21d of lithium ion secondary batteries.

The battery pack 20 contains the battery stack 25, a charge/discharge control circuit 26 that controls charging/ discharging of the battery stack 25, the protection element 1 wherein the present invention is applied for cutting off the charging/discharging path of the battery stack 25 when there is an abnormality, a detecting circuit 27 for detecting the voltage of each of the battery cells 21a through 21d, and a current control element 28 which is a switch element controlling operation of the protection element 1 based on the detection result of the detecting circuit 27.

The battery stack 25 is formed by series-connected battery cells 21a to 21d that require control to protect against overcharging and over-discharging states, is detachably connected to a charging device 22 by a positive terminal 20a and a negative terminal 20b of the battery pack 20, and has charging voltage from the charging device 22 applied thereto. By connecting the positive terminal 20a and the negative terminal 20b of the battery pack 20 charged by the charging device 22 to a battery-operated electronic device, the electronic device can be operated.

The charge/discharge control circuit 26 includes two current control elements 23a and 23b connected in series to the electric current path between the battery stack 25 and the charging device 22, and a controller 24 that controls the operation of these current control elements 23a and 23b. The current control elements 23a and 23b are constituted of, for example, field-effect transistors (hereinafter referred to as FET), and control the conduction and interruption to the charging direction and/or discharging direction of the electric current path of the battery stack 25 by controlling the gate voltage using the controller 24. The controller 24 receives power supplied from the charging device 22 to operate and when detection results from the detection circuit 27 indicate that the battery stack is overcharging or over-discharging, the controller controls operation of the current control elements 23a and 23b so as to cut off the current path.

The protection element 1 is connected, for example, on a charging/discharging current path between the battery stack 25 and the charge/discharge control circuit 26, and the operation thereof is controlled by the current control element 28.

The detecting circuit 27 is connected to each battery cell 21a through 21d, detects the voltage value of each battery cell 21a through 21d, and supplies each voltage value to the controller 24 of the charge/discharge control circuit 26. Moreover, the detecting circuit 27 outputs a control signal for controlling the current control element 28 when any one of the battery cells 21a through 21d reaches an overcharge voltage or an over-discharge voltage.

The current control element 28 is constituted of, for example, an FET, and activates the protection element 1 by a detection signal output from the detecting circuit 27 when the voltage values of the battery cells 21a through 21d exceed a prescribed overcharge or over-discharge voltage, to control cutoff of the charging/discharging current path of the battery stack 25 instead of a switch operation of the current control elements 23a and 23b.

Figure 6:
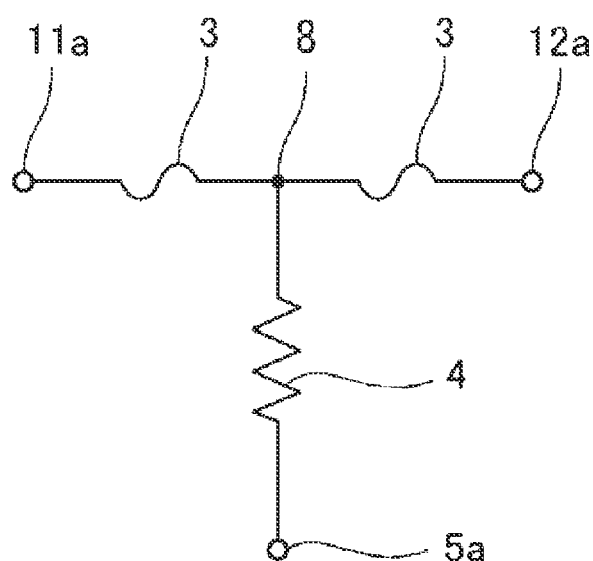
FIG. 6 is a circuit diagram of the protection element according to Embodiment 1.

The protection element 1 to which the present invention is applied and is used in the battery pack 20 configured as described above has a circuit configuration as illustrated in FIG. 6. In other words, in the protection element 1, the first external connection electrode 11a is connected to the battery stack 25 side, and the second external connecting electrode 12a is connected to the positive terminal 20a side, thereby, the fuse element 3 is connected in series on the charging/discharging path of the battery stack 25. In addition, in the protection element 1, the heating element 4 is connected to the current control element 28 through the heating element power supply electrode 5 and the third external connection electrode 5*a*, and the heating element 4 is connected to the open end of the battery stack 25. In this manner, a first end of the heating element 4 is connected to the fuse element 3 and the first open end of the battery stack 25 via the intermediate electrode 8, and a second end is connected to the current control element 28 and the second open end of the battery stack 25 via the third external connection electrode 5*a*, thereby a power supply path to the heating element 4 is formed in which the electric current flow is controlled by the current control element 28.

Operation of Protection Element

When detecting circuit 27 detects an abnormal voltage in any one of battery cells 21*a* through 21*d*, the circuit outputs a shutoff signal to the current control element 28. Then, the current control element 28 controls the current for energizing the heating element 4. In the protection element 1, a current flows from battery stack 25 to the heating element 4, whereby heating element 4 starts to generate heat. In the protection element 1, the fuse element 3 is blown due to the heat generated by the heating element 4, and the charging/discharging path of the battery stack 25 is cut off. In addition, with regards to the protection element 1, by forming the fuse element 3 containing a high melting point metal and a low melting point metal, using the erosion action of the high melting point metal by the low melting point metal due to the melting of the low melting point metal melting before the high melting point metal melts, the fuse element 3 is blown in a short period of time.

At this time, in the protection element 1, since, in plan view, the intermediate electrode 8 does not overlap with the high potential first extraction electrode 6 but overlaps with the low potential second extraction electrode 10, the intermediate electrode 8 is formed at a position separated from the first extraction electrode 6. As a result, in the protection element 1, forming of a discharge path between the first extraction electrode 6 which is the high-potential portion and the intermediate electrode 8 which is a low-potential portion becomes difficult, thereby a spark (discharge) is less likely to occur even if high voltage is applied from an external circuit, and the electric current path can be cut off safely and quickly.

Furthermore, with the protection element 1, the intermediate electrode 8 overlaps with the second extraction electrode 10, so that the intermediate electrode 8 and the heating element 4 are thermally connected via the second extraction electrode 10 and the insulating layer 7, enabling the intermediate electrode 8 and the fuse element 3 mounted thereon to be efficiently heated. Therefore, the fuse element 3 can be blown quickly after electric current is applied to the heating element 4.

When the fuse element 3 is blown, the protection element 1 shuts off the power supply path to the heating element 4, so that the heat generation of the heating element 4 is stopped.

In the protection element 1, the fuse element 3 is blown due to self-heating even when an overcurrent exceeding the rated value is applied to the battery pack 20, and the charging/discharging path of the battery pack 20 can be cut off.

In this manner, with the protection element 1, the fuse element 3 is blown by heat generated by the heating element 4 or by self-heating of the fuse element 3 due to overcurrent. At this time, when the protection element 1 is reflow-mounted on the circuit board, or when the circuit board on which the protection element 1 is mounted is further exposed to a high-temperature environment such as reflow heating, by having the structure of the low melting point metal covered by the high melting point metal, deformation of the fuse element 3 can be suppressed. Therefore, fluctuation in the blow characteristics due to a fluctuation in the resistance value caused by deformation of the fuse element 3 can be prevented and being blown quickly due to heat generation from a prescribed overcurrent or heat generation of the heating element 4 is also feasible.

The protection element 1 according to the present invention is not limited to being used in battery packs for lithium-ion secondary batteries, but can of course be applied to various uses that require cut-off of current paths by electrical signals.

EXAMPLES

Figure 27:
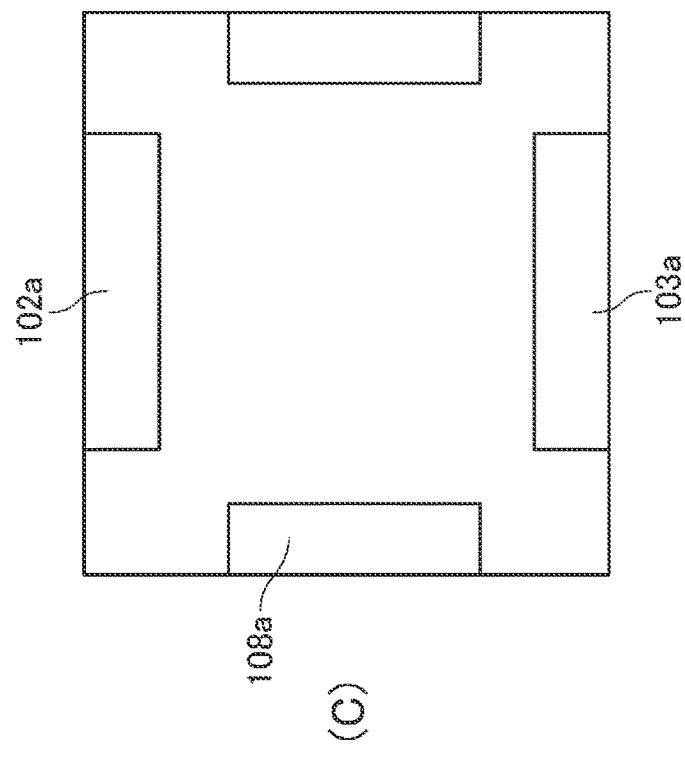
FIG. 27 illustrates a conventional protection element. (A) is a plan view, (B) is a cross-sectional view, and (C) is a bottom view.
Figure 27:
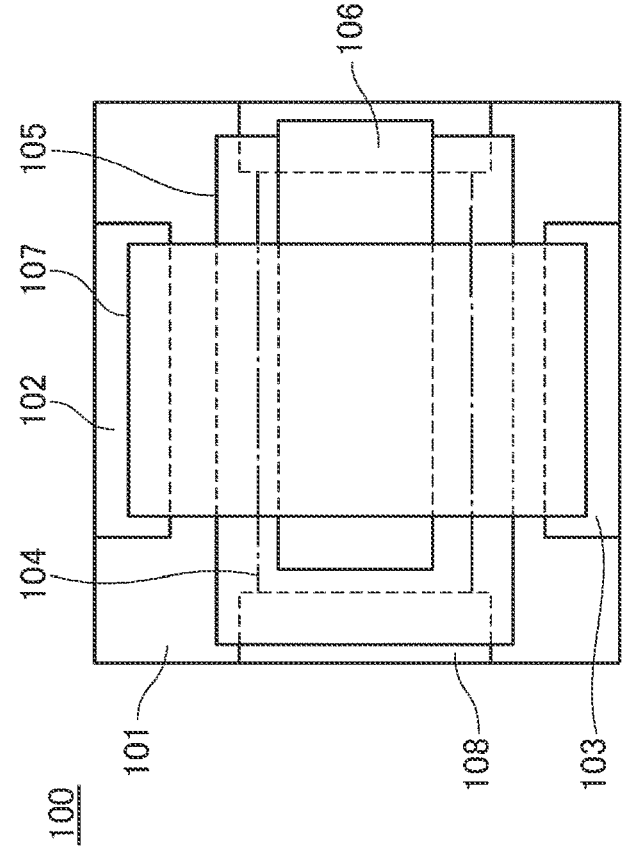
Figure 27:
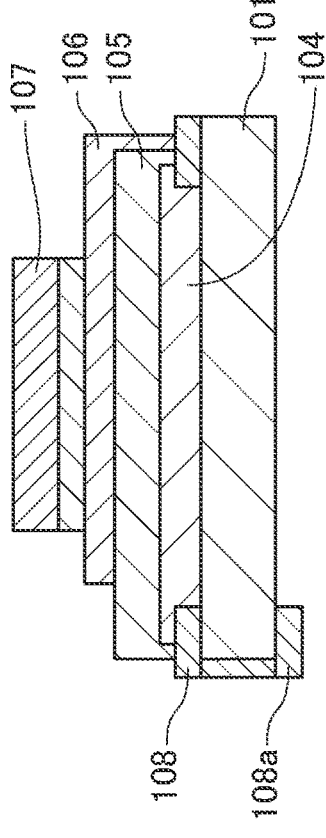
Figure 28:
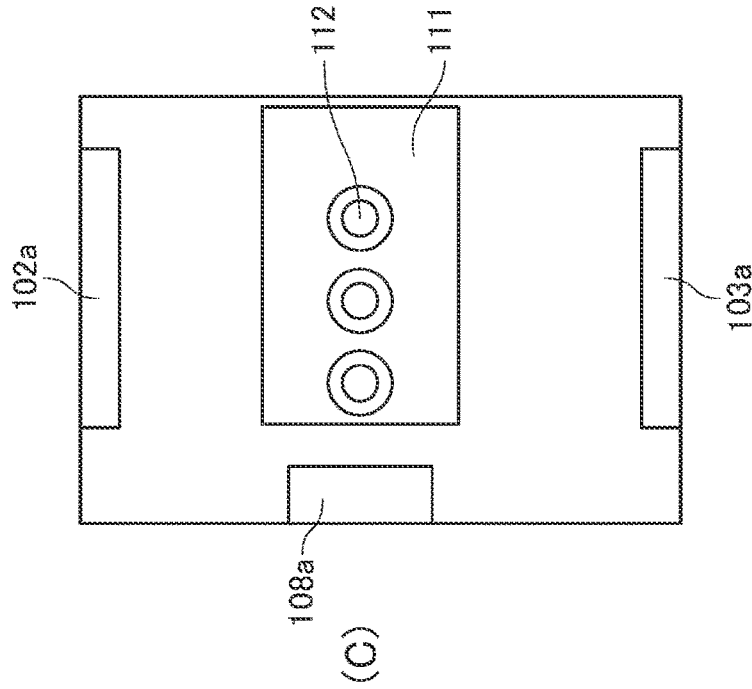
FIG. 28 illustrates a conventional protection element. (A) is a plan view, (B) is a cross-sectional view, and (C) is a bottom view.
Figure 28:
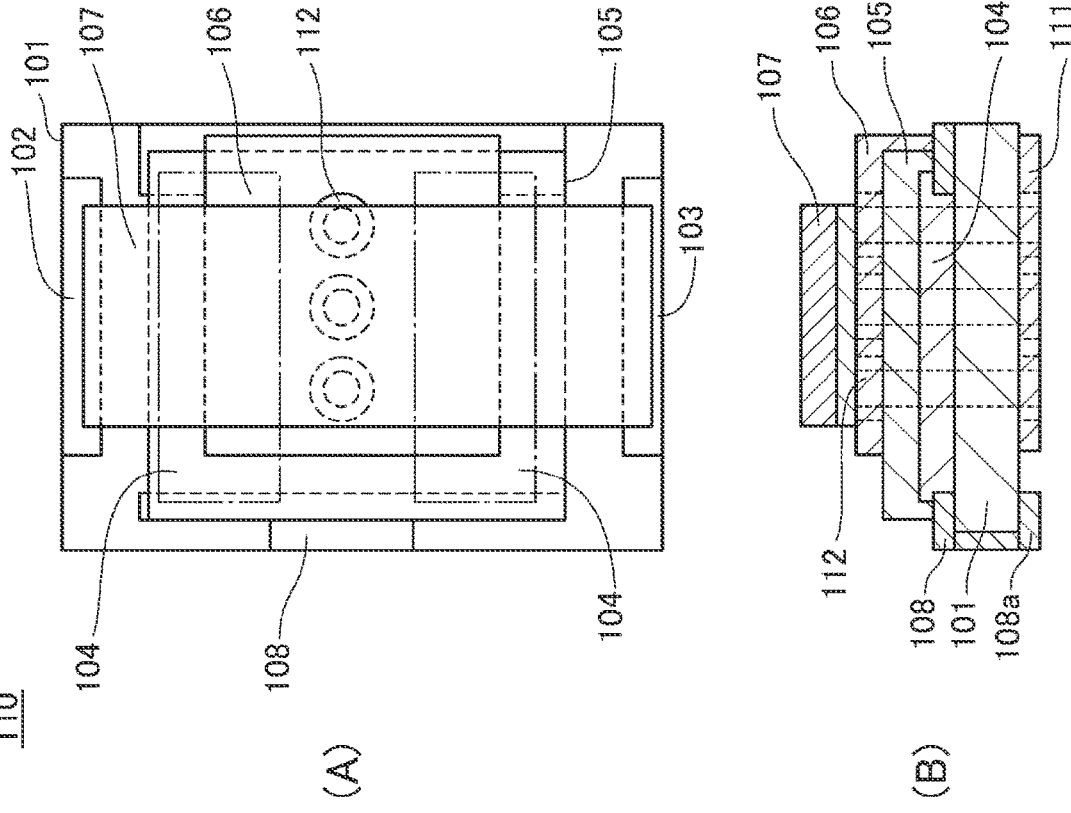
Figure 29:
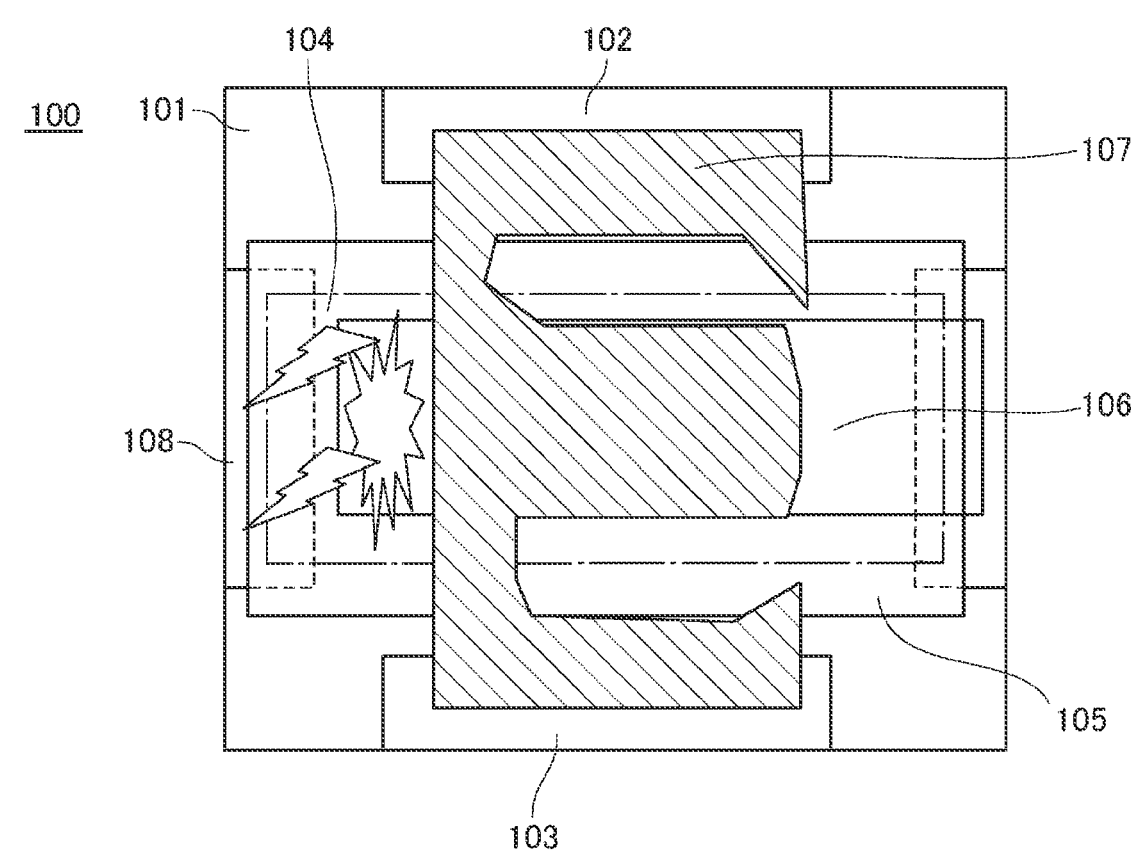
FIG. 29 is a plan view illustrating a spark generated in the protection element illustrated in FIG. 27.
Figure 30:
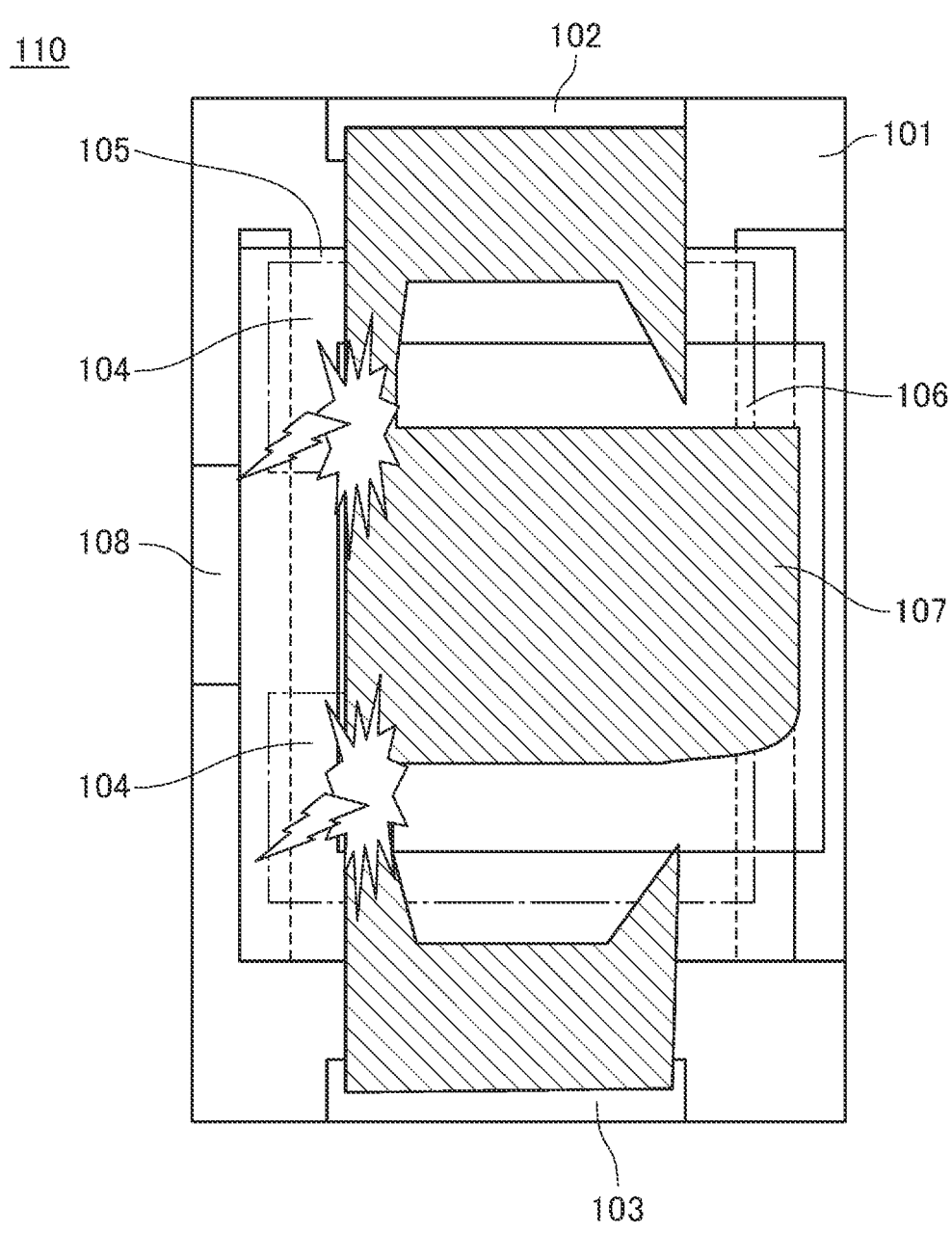
FIG. 30 is a plan view illustrating a spark generated in the protection element illustrated in FIG. 28.
Figure 31:
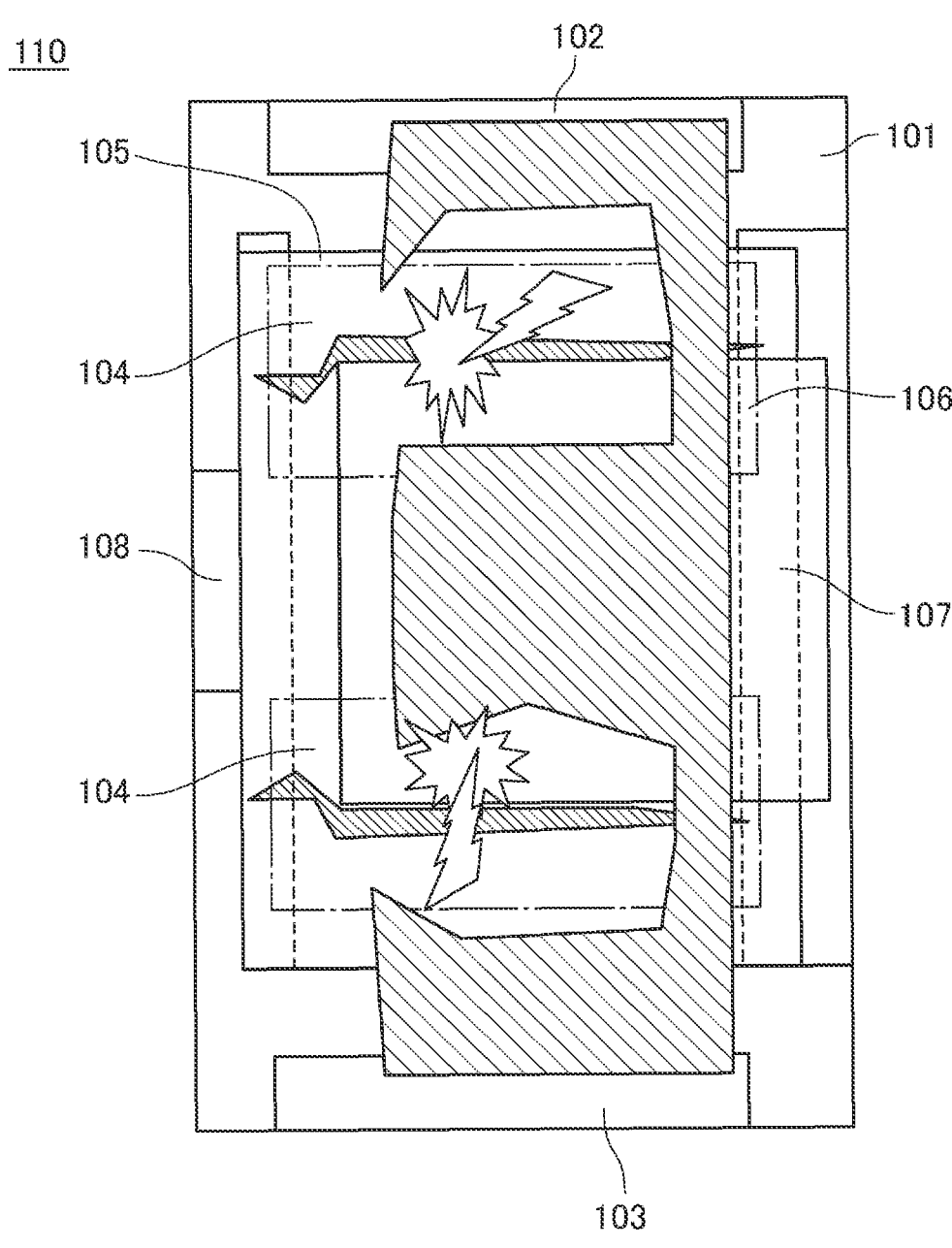
FIG. 31 is a plan view illustrating a spark generated in the protection element illustrated in FIG. 28.

Next, an Example of the protection element 1 is described. In this Example, a protection element 1 illustrated in FIG. 1 (Example) and a protection element illustrated in FIG. 27 (Comparative Example) were prepared and voltages of 50 V, 100 V, and 200 V were applied to determine whether a spark was generated. In addition, the variation (standard deviation σ) of the blowout time of the fuse element when low power (43 W) and high power (180 W) were applied was obtained (50 samples) and compared.

Figure 7:
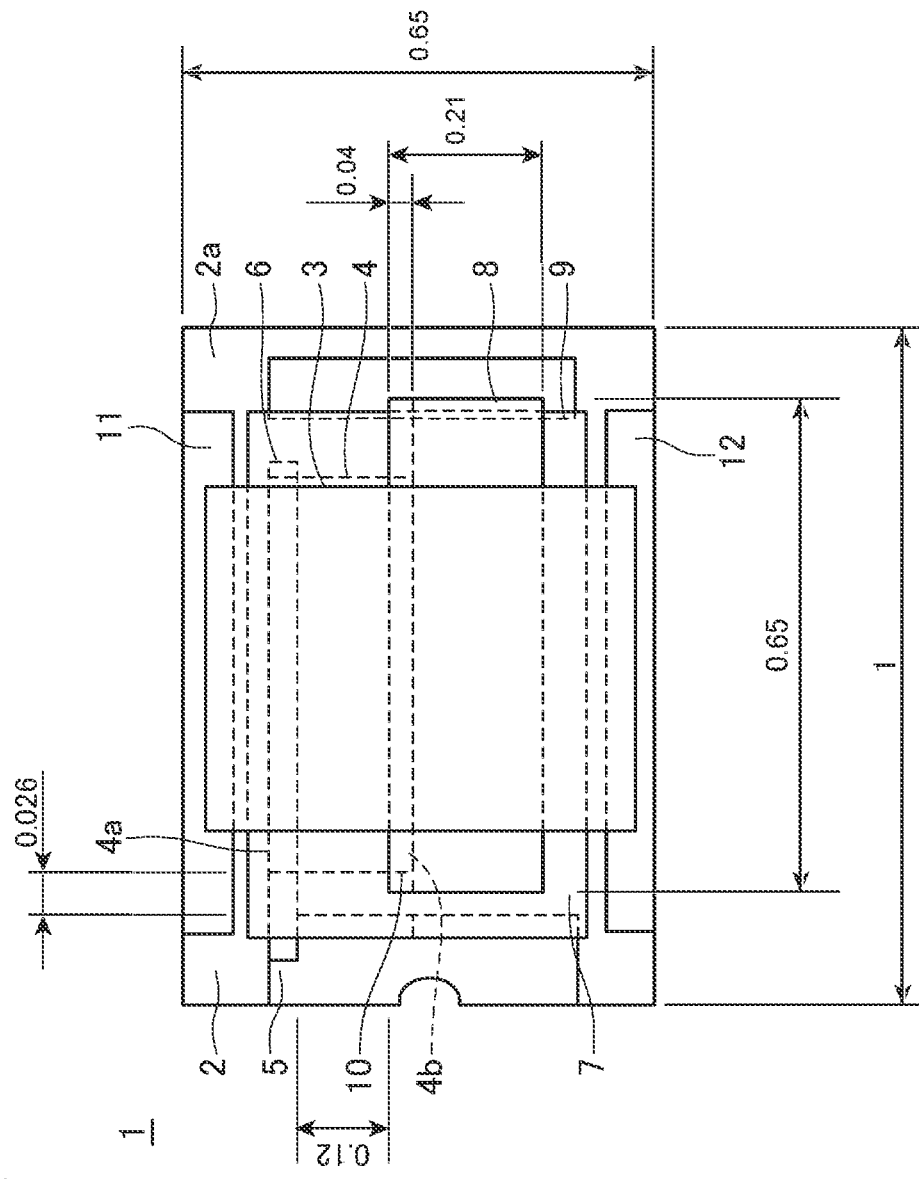
FIG. 7 is a plan view illustrating the relative dimensions of the protection element according to an Example.
Figure 8:
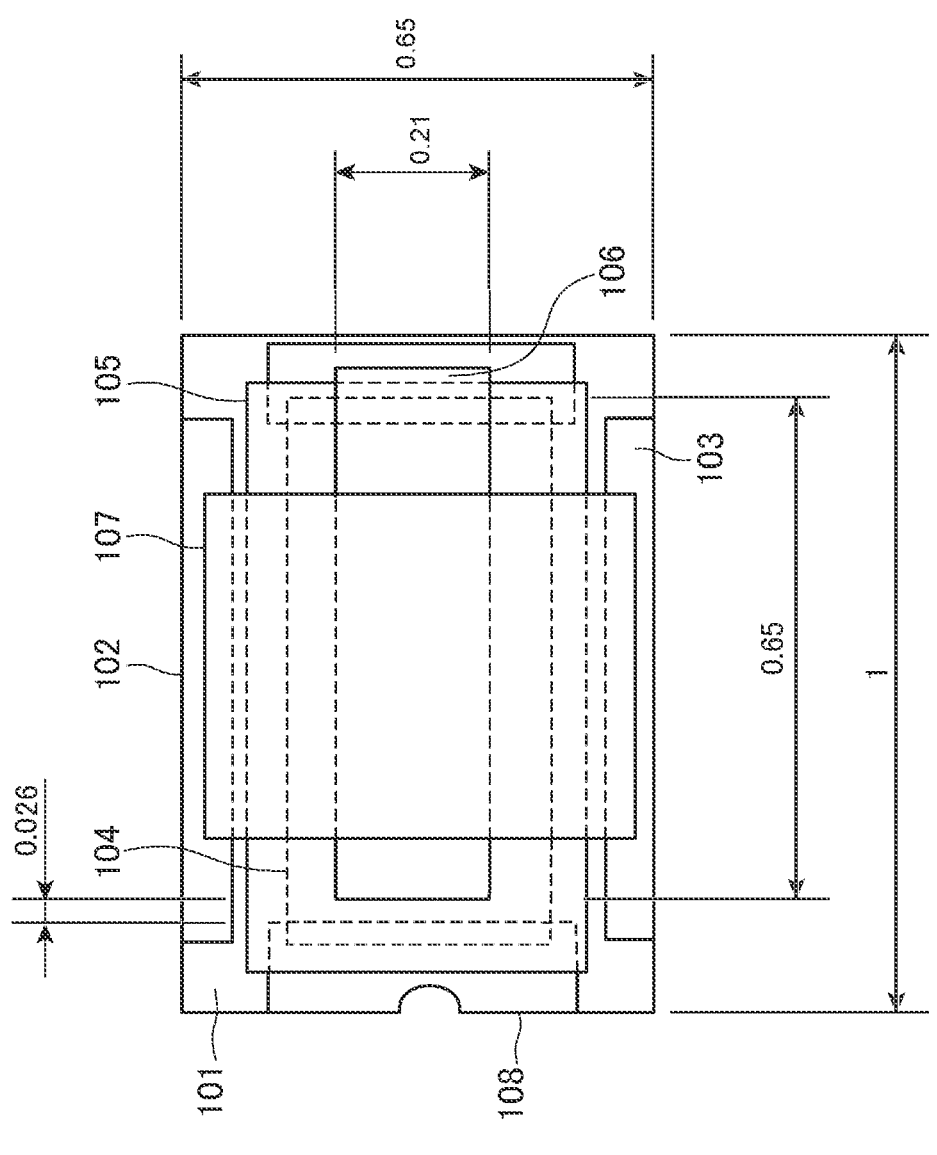
FIG. 8 is a plan view illustrating the relative dimensions of the protection element according to a Comparative Example.

The dimensions of the protection element according to the Example are illustrated in FIG. 7, and the dimensions of the protection element according to the Comparative Example are illustrated in FIG. 8. The numerical values of each size shown in FIG. 7 and FIG. 8 are relative values indicating the ratio when the length of the insulating substrate is set to 1.

Example

The size of the protection element according to the Example is as follows.

Insulation substrate: 1×0.65

Intermediate electrode: 0.65×0.21

Distance between heating element power supply electrode and intermediate electrode: 0.026

Overlapping width of second extraction electrode and intermediate electrode: 0.04

Heating element width between the first extraction electrode and the second extraction electrode: 0.12

Comparative Example

The size of a protection element according to the Comparative Example is as follows.

Insulation substrate: 1×0.65

Intermediate electrode: 0.65×0.21

Distance between heating element power supply electrode and intermediate electrode: 0.026

TABLE 1

|  |  | Example | Comparative Example |
|---|---|---|---|
| Applied voltage | 50 [V] | No spark | No spark |
|  | 100 [V] | No spark | Spark |
|  | 200 [V] | No spark | Spark |

The distance between the heating element power supply electrode and the intermediate electrode is 0.026 in both the Example and the Comparative Example. As indicated in Table 1, in the Example, no spark occurred when any of the voltages 50 V, 100 V and 200 V were applied. On the other hand, in the Comparative Example, no spark occurred when a voltage of 50 V was applied, but a spark occurred when voltages of 100 V and 200 V were applied.

Therefore, as in the protection element 1 illustrated in FIG. 1, along with leading the first extraction electrode 6 from the heating element power supply electrode 5 to which a higher voltage is applied, in plan view, by the intermediate electrode 8 not overlapping with the first extraction electrode 6 but overlapping with the second extraction electrode 10, the intermediate electrode 8 can be formed at a position separated from the first extraction electrode 6. Therefore, in the protection element 1, forming of the discharge path between the first extraction electrode 6 which is the high-potential portion and the intermediate electrode 8 which is a low-potential portion does not readily occur, and the effectiveness of the structure for preventing a spark when high power is applied can be seen.

TABLE 2

| Applied power | 43 [W] | Example | Comparative Example |
|---|---|---|---|
| Operating time [S] | Max. | 12.34 | 25.31 |
| | Min. | 8.84 | 11.21 |
| | Avg. | 10.37 | 17.36 |
| Variability | σ | 0.74 | 1.59 |

As indicated in Table 2, when the protection element according to the Example was operated at 43 W, the maximum blowout time (seconds) was 12.34 seconds, the minimum time was 8.84 seconds, and the average time of 50 samples was 10.37 seconds with a standard deviation of $\sigma=0.74$. On the other hand, when the protection element according to the Comparative Example was operated at 43 W, the maximum blowout time (seconds) was 25.31 seconds, the minimum time was 11.21 seconds, and the average time of 50 samples was 17.36 seconds with a standard deviation of $\sigma=1.59$.

TABLE 3

| Applied power | 180 [W] | Example | Comparative Example |
|---|---|---|---|
| Operating time [S] | Max. | 1.29 | 1.71 |
| | Min. | 1.07 | 1.18 |
| | Avg. | 1.18 | 1.35 |
| Variability | σ | 0.045 | 0.079 |

As indicated in Table 3, when the protection element according to the Example was operated at 180 W, the maximum blowout time (seconds) was 1.29 seconds, the minimum time was 1.07 seconds, and the average time of 50 samples was 1.18 seconds with a standard deviation of $\sigma=0.045$. On the other hand, when the protection element according to the Comparative Example was operated at 180 W, the maximum blowout time (seconds) was 1.71 seconds, the minimum time was 1.18 seconds, and the average time of 50 samples was 1.35 seconds a with standard deviation of $\sigma=0.079$.

As indicated in Table 2 and Table 3, as in the protection element 1 illustrated in FIG. 1, the intermediate electrode 8 overlapping the second extraction electrode 10 results in the intermediate electrode 8 and the heating element 4 being thermally connected via the second extraction electrode 10 and the insulating layer 7, thereby the intermediate electrode 8 and the fuse element 3 mounted thereon can be efficiently heated, enabling the fuse element 3 to be blown out quickly, and the suppressing of blowout time variations for each product even at a low power can be seen. On the other hand, in the protection element according to the Comparative Example, the blowout time was long, and the variability was large.

Embodiment 2

Figure 9:
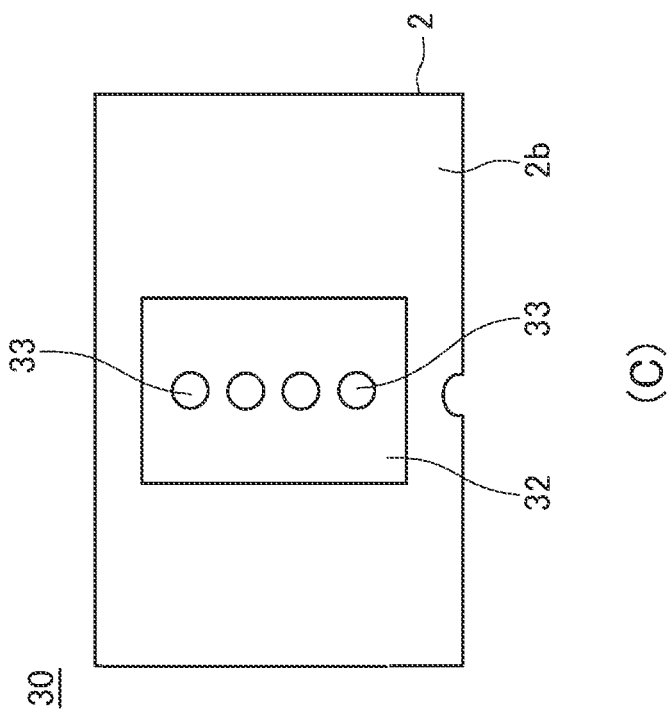
FIG. 9 illustrates Embodiment 2 of the protection element where the present technology is applied. (A) is a plan view, (B) is a cross-sectional view, and (C) is a bottom view.
Figure 9:
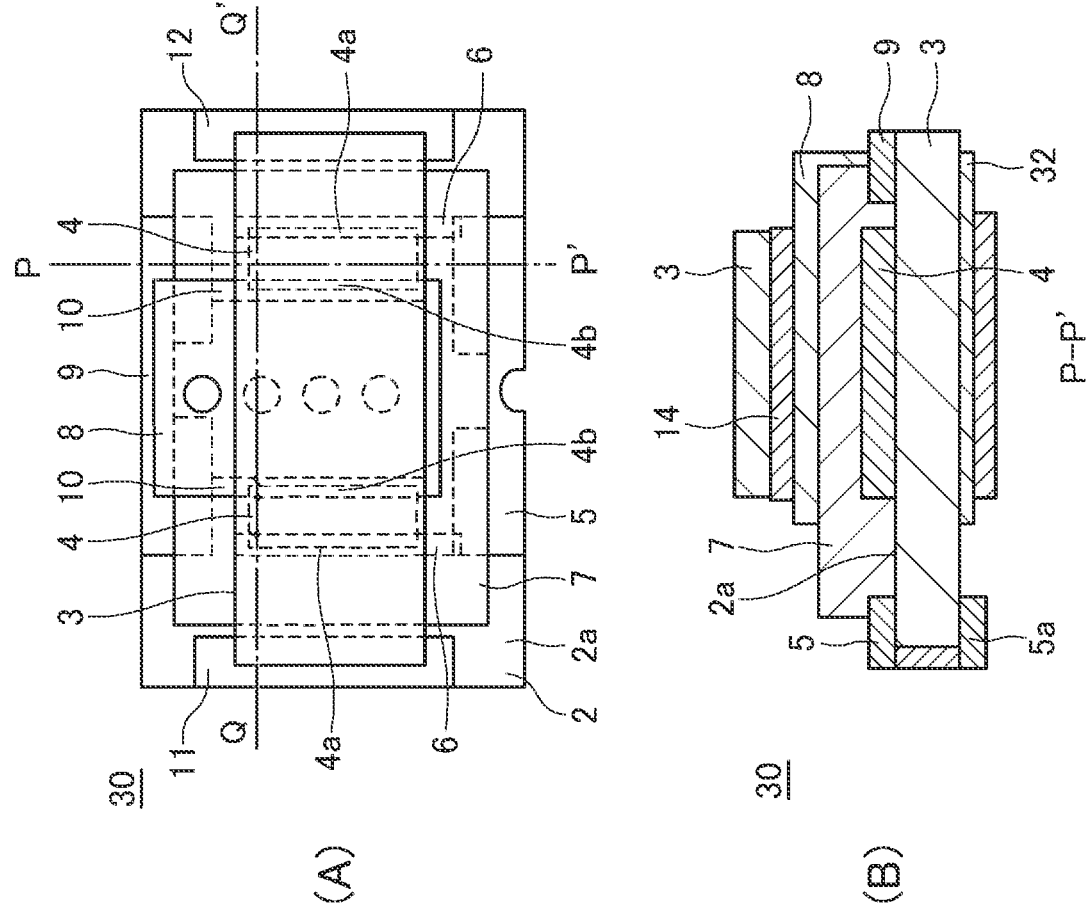

Next, Embodiment 2 wherein the protection element to which the present technology is applied is described. In the following description, the same reference codes may be given to the same configurations as those of the protection element 1 described above, and the details thereof may be omitted. A protection element 30 according to Embodiment 2 as illustrated in FIG. 9 (A) through (C), has an insulating substrate 2, a fuse element 3 provided on a front surface 2a side of the insulating substrate 2, a plurality of heating elements 4 formed on the insulating substrate 2 for blowing the fuse element 3 by heat generation, a heating element power supply electrode 5 as a power supply terminal to each of the heating elements 4, a plurality of first extraction electrodes 6 led from the heating element power supply electrode 5 and connected to a first end 4a of each of the heating elements 4, an insulating layer 7 covering the heating elements 4, an intermediate electrode 8 formed on the insulating layer 7 and having the fuse element 3 mounted thereon, a heating element connecting electrode 9 formed between the heating element 4 and the intermediate electrode 8 on the front surface 2a side of the insulating substrate 2 and connecting each of the heating elements 4 and the intermediate electrode 8, and a second extraction electrode 10 led from the heating element connecting electrode 9 and connected to a second end 4b of each of the heating elements 4.

In the protection element 30, a plurality of heating elements 4 are provided side by side on the front surface 2a of the insulating substrate 2 with a space therebetween. Each heating element 4 has the first end 4a connected to the heating element power supply electrode 5 via the first extraction electrode 6, and the second end 4b connected to the heating element connecting electrode 9 via the second extraction electrode 10. The heating element connecting electrode 9 is connected to the intermediate electrode 8. In each of the heating elements 4, when the power is applied via the heating element power supply electrode 5, the heating element power supply electrode 5 and the first extraction electrode 6 side is the high-potential portion, and the second extraction electrode 10, the heating element connecting electrode 9, and the intermediate electrode 8 side is the low-potential portion. Furthermore, for the protection element 30, the intermediate electrode 8 does not overlap with each of the first extraction electrodes 6, but overlaps with each of the second extraction electrodes 10 in plan view.

Thus, with the protection element 30, the intermediate electrode 8 is formed at a position separated from each of the first extraction electrodes 6, so formation of a discharge path between the first extraction electrodes 6 which are the high-potential portion and the intermediate electrode 8 which is the low-potential portion becomes difficult, thereby a spark (discharge) is less likely to occur, and the electric current path can be cut off safely and quickly.

Furthermore, with the protection element 30, the intermediate electrode 8 overlaps with each of the second extraction electrodes 10, so that the intermediate electrode 8 and the second extraction electrodes 10 are thermally connected via the insulating layer 7, resulting in enabling the intermediate electrode 8 and the fuse element 3 mounted thereon to be efficiently heated. Therefore, the fuse element 3 can be blown quickly after electric current is applied to each of the heating elements 4.

Figure 10:
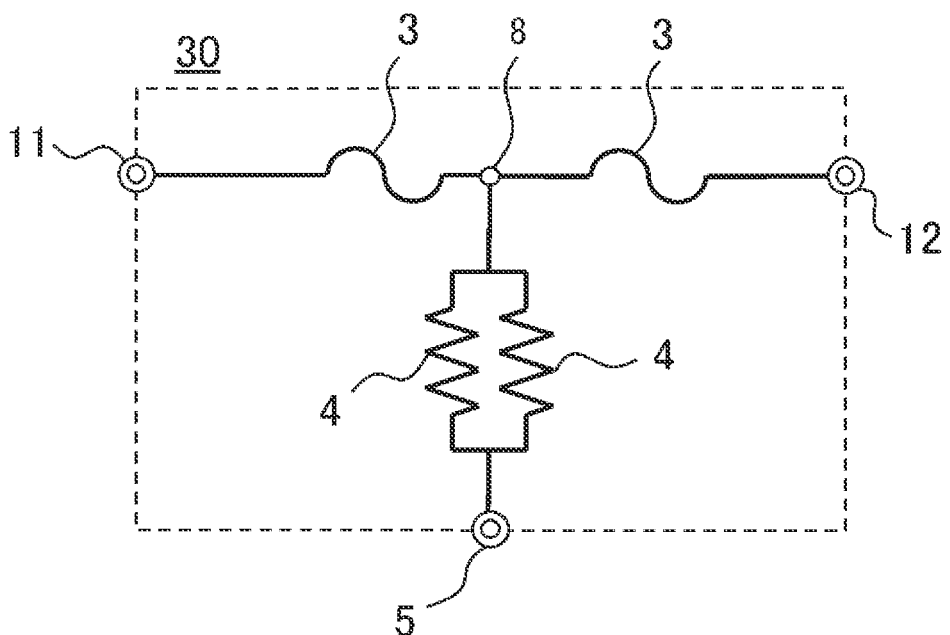
FIG. 10 is a circuit diagram of the protection element according to Embodiment 2.

FIG. 10 is a circuit diagram of the protection element 30. In the protection element 30, each of the first ends of the plurality of heating elements 4 are connected to a power supply to cause the heating elements 4 to generate heat via the heating element power supply electrode 5 formed on the insulating substrate 2, and each of the second ends of the heating elements 4 are connected to the fuse element 3 via the intermediate electrode 8.

Retention Electrode

Figure 11:
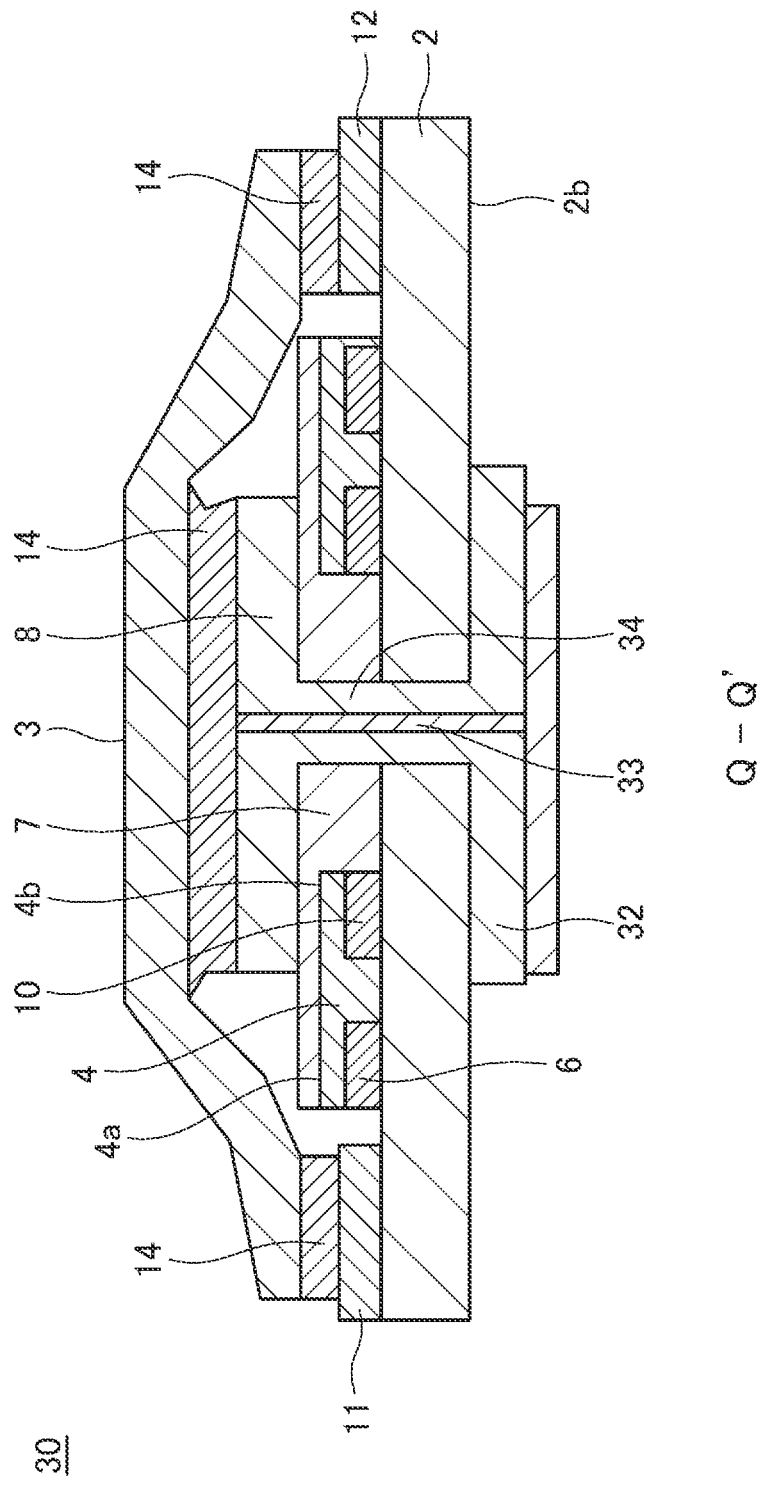
FIG. 11 is a cross-sectional view of the protection element according to Embodiment 2.

In addition, as illustrated in FIG. 11, with the protection element 30, a retention electrode 32 may be formed on the back surface 2b of the insulating substrate 2 to retain a fused conductor 3a of the fuse element 3, and the intermediate electrode 8 and the retention electrode 32 are contiguous via a through hole 33 that passes through the insulating substrate 2, and the fused conductor 3a of the blown fuse element 3 can be drawn to the retention electrode 32 side via the through hole 33.

Figure 12:
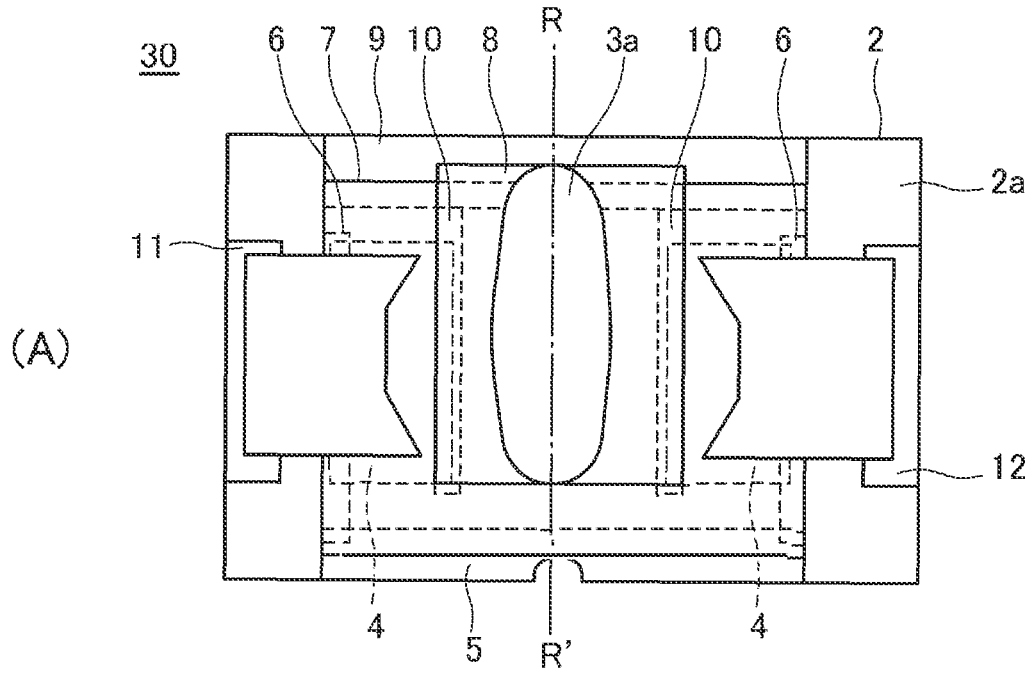
FIG. 12 illustrates the fuse element blown in the protection element according to Embodiment 2. (A) is a plan view, and (B) is a cross-sectional view.
Figure 12:
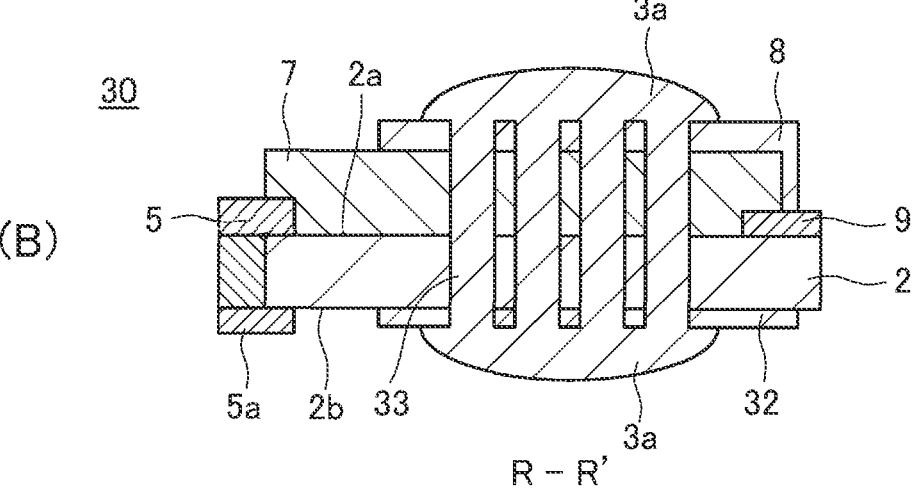

When the fuse element 3 is blown, the through hole 33 can draw the fused conductor 3a by capillary action and reduce the volume of the fused conductor 3a retained on the intermediate electrode 8. Thus, as illustrated in FIG. 12 (A) (B), even if melt volume is increased by the size increase of a fuse element 3 due to higher rating and capacity of the protection element, a large volume of fused conductor 3a can be retained by the retention electrode 32, the intermediate electrode 8, and the first and second electrodes 11 and 12, guaranteeing the blowing of the fuse element 3.

Similar to the intermediate electrode 8, the retention electrode 32 can be formed by a known method such as printing using a known electrode material such as Ag, Cu, or an alloy material containing Ag or Cu as a main component.

A conductive layer 34 is formed on the inner surface of the through hole 33. By forming the conductive layer 34, the through hole 33 can readily draw the fused conductor 3a. The conductive layer 34 is formed of, for example, any one of copper, silver, gold, iron, nickel, palladium, lead, and tin, or an alloy containing any one thereof as a main component, and the inner surface of the through hole 33 can be formed using a known method such as electroplating or printing of a conductive paste. In addition, the conductive layer 34 may be formed by inserting a plurality of metal wires or an aggregate of conductive ribbons into the through holes 33.

The conductive layer 34 of the through hole 33 is contiguous with the intermediate electrode 8 formed on the front surface 2a of the insulating substrate 2. With regards to the intermediate electrode 8, in addition to supporting the fuse element 3, since the fused conductor 3a aggregates when blown, the fused conductor 3a can be readily guided into the through hole 33 because the intermediate electrode 8 and conductive layer 34 are contiguous.

In addition, the conductive layer 34 of the through hole 33 is contiguous with the retention electrode 32 formed on the back surface 2b of the insulating substrate 2. Therefore, when the fuse element 3 melts, the fused conductor 3a drawn via the through hole 33 can be aggregated on the retention electrode 32 (see FIG. 12), and by drawing more of the fused conductor 3a, the volume of the fused conductor 3a retained by the intermediate electrode 8 and the first and second electrodes 11 and 12 at the blown out portion of the fuse element 3 can be reduced.

Also, a plurality of through holes 33 may be formed in the protection element 30 to increase the number of paths for drawing the fused conductor 3a of the fuse element 3, and by drawing more of the fused conductor 3a, the volume of the fused conductor 3a at the blown out portion can be reduced.

In addition, the protection element 30 having the heating elements 4 formed on both sides of the through hole 33 in order to heat the retention electrode 32 and the intermediate electrode 8 and to aggregate and draw more fused conductor 3a is preferable.

Embodiment 3

Figure 13:
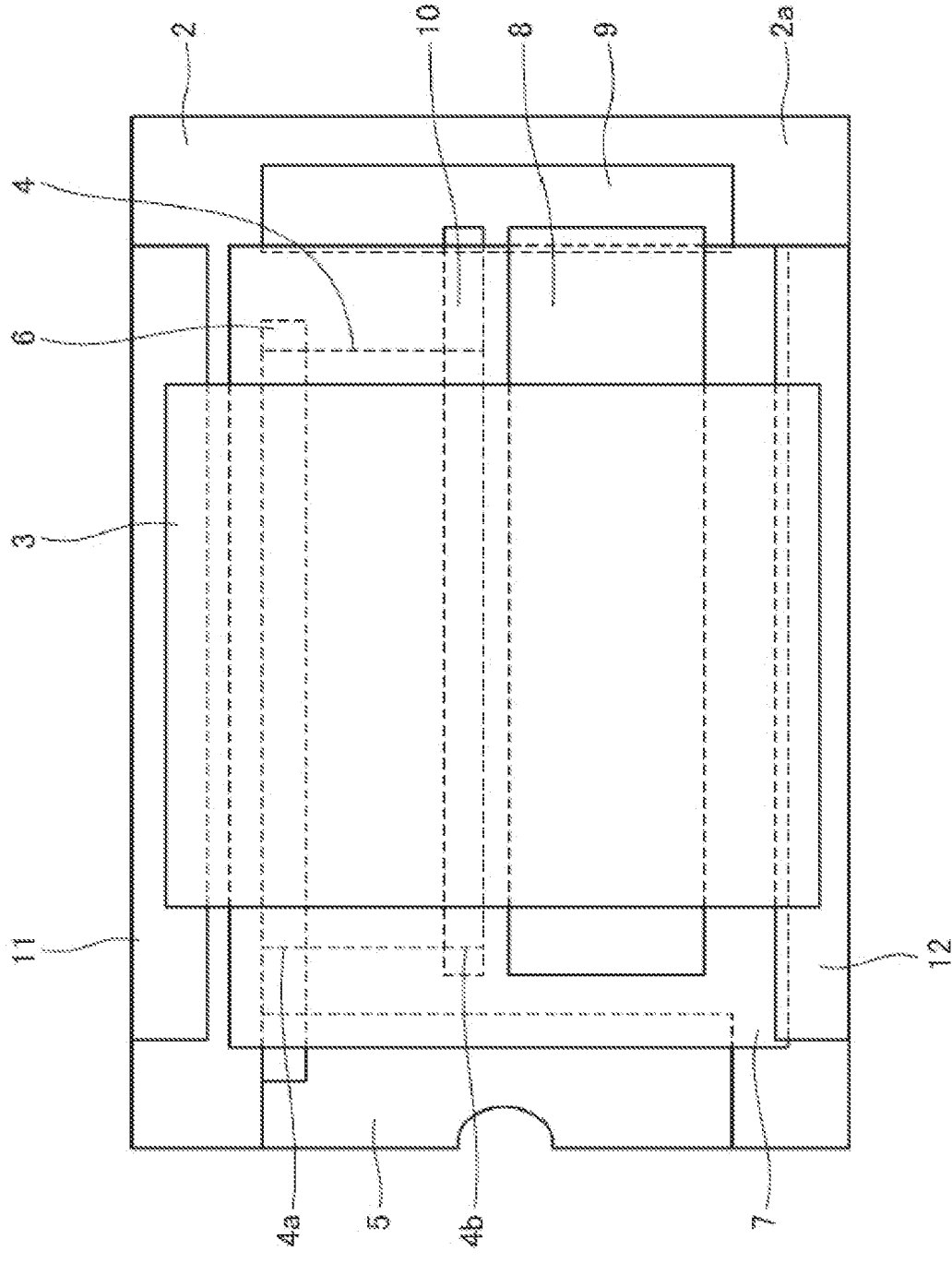
FIG. 13 illustrates Embodiment 3 of the protection element where the present technology is applied.

Next, Embodiment 3 wherein the protection element to which the present technology is applied is described. In the following description, the same reference codes may be given to the same configurations as those of the protection elements 1 and 30 described above, and the details thereof may be omitted. In a protection element 40 according to Embodiment 3, as illustrated in FIG. 13, the first extraction electrode 6, the heating element 4, the second extraction electrode 10, and the intermediate electrode 8 are arranged in this order in a plan view. In the protection element 40, the second extraction electrode 10 and the intermediate electrode 8 do not overlap in a plan view.

In the protection element 40, the intermediate electrode 8 does not overlap with the second extraction electrode 10, so the thermal connection between the intermediate electrode 8 and the second extraction electrode 10 is weaker compared to in the protection element 1. Therefore, the protection element 40 may be inferior to the protection element 1 regarding rapid blowout capability of the fuse element 3.

However, in the protection element 40, the intermediate electrode 8 does not overlap with the first extraction electrode 6 that conducts current for heat generation in the heating element 4, a heating element 8, or the second extraction electrode 10, and compared to the protection element 1, the intermediate electrode 8 is formed at a position further separated from the first extraction electrode 6. This makes formation of a discharge path between the first extraction electrode 6 which is a high-potential portion and the intermediate electrode 8 which is a low-potential portion difficult, thereby a spark is less likely to occur. Therefore, the insulating layer 7 and the intermediate electrode 8 are not damaged, the thermal conductivity to the fuse element 3 is maintained, the fuse element 3 can be blown quickly, and the electric current path can be cut off safely.

In the protection element 40, as in the protection element 30, a plurality of heating elements 4 and a plurality of first and second extraction electrodes 6 and 10 may be formed. In this case as well, the intermediate electrode 8 does not overlap with any of the second extraction electrodes 10 and is arranged at a position further separated from each of the first extraction electrodes 6. Therefore, even when a high voltage is applied, a spark can be prevented.

Embodiment 4

Figure 14:
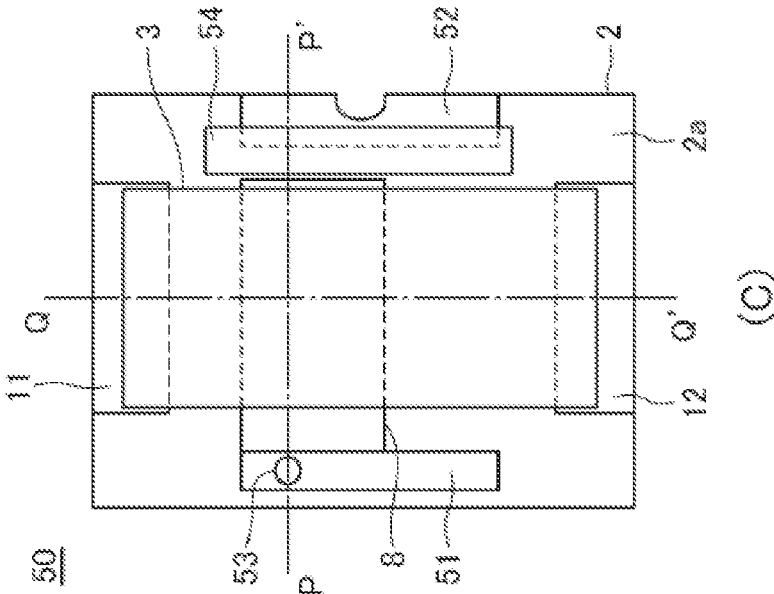
FIG. 14 illustrates Embodiment 4 of the protection element where the present technology is applied. (A) is a plan view, (B) is a cross-sectional view, and (C) is a lower surface view.
Figure 14:
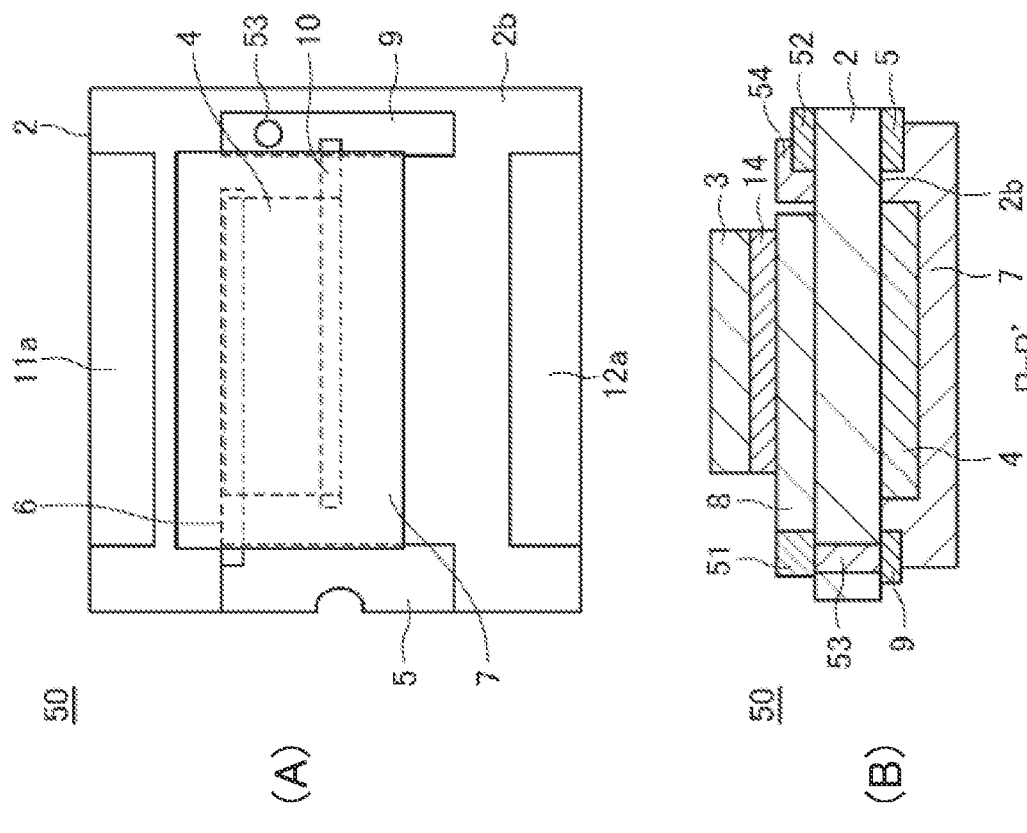
Figure 15:
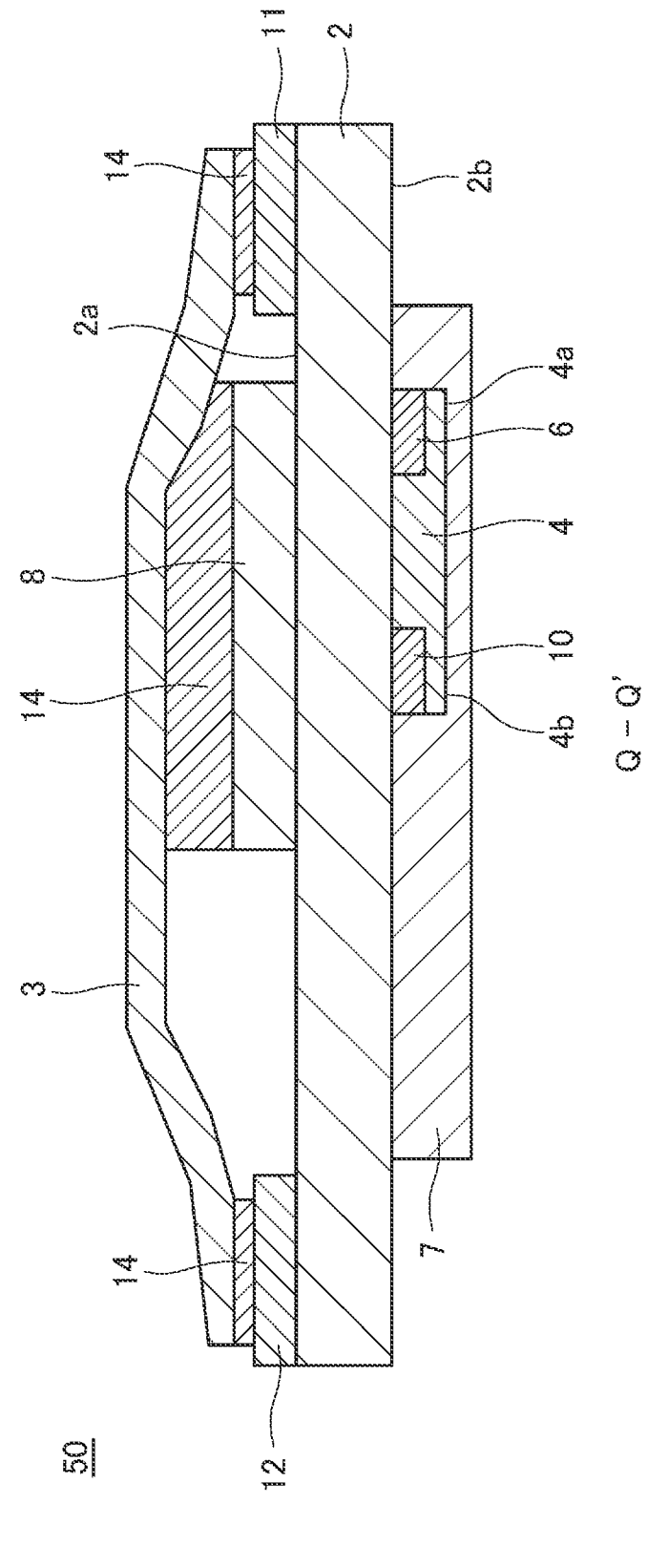
FIG. 15 is a cross-sectional view of the protection element according to Embodiment 4.

Next, Embodiment 4 wherein the protection element to which the present technology is applied is described. In the following description, the same reference codes may be given to the same configurations as those of the protection elements 1, 30, and 40 described above, and the details thereof may be omitted. As shown in FIG. 14 (A) through (C), FIG. 15, and FIGS. 16 (A) and (B), a protection element 50 according to Embodiment 4 has, on a back surface 2b opposite to a front surface 2a of an insulating substrate 2, a heating element 4, a heating element power supply electrode 5, a first extraction electrode 6, a heating element connecting electrode 9, a second extraction electrode 10, and an insulating layer 7 covering these. The protection element 50 also has, on the front surface 2a of the insulating substrate 2, an intermediate electrode 8 on which a fuse element 3 is mounted, a first connecting electrode 51 connecting the intermediate electrode 8 and the heating element connecting electrode 9, a second connecting electrode 52 connected to the heating element power supply electrode 5 via a castellation, a first electrode 11, and a second electrode 12.

The first connecting electrode 51 and a second connecting electrode 52 can be formed using the same material and the same process as those of the heating element power supply electrode 5 and the heating element connecting electrode 9 described above.

Figure 16:
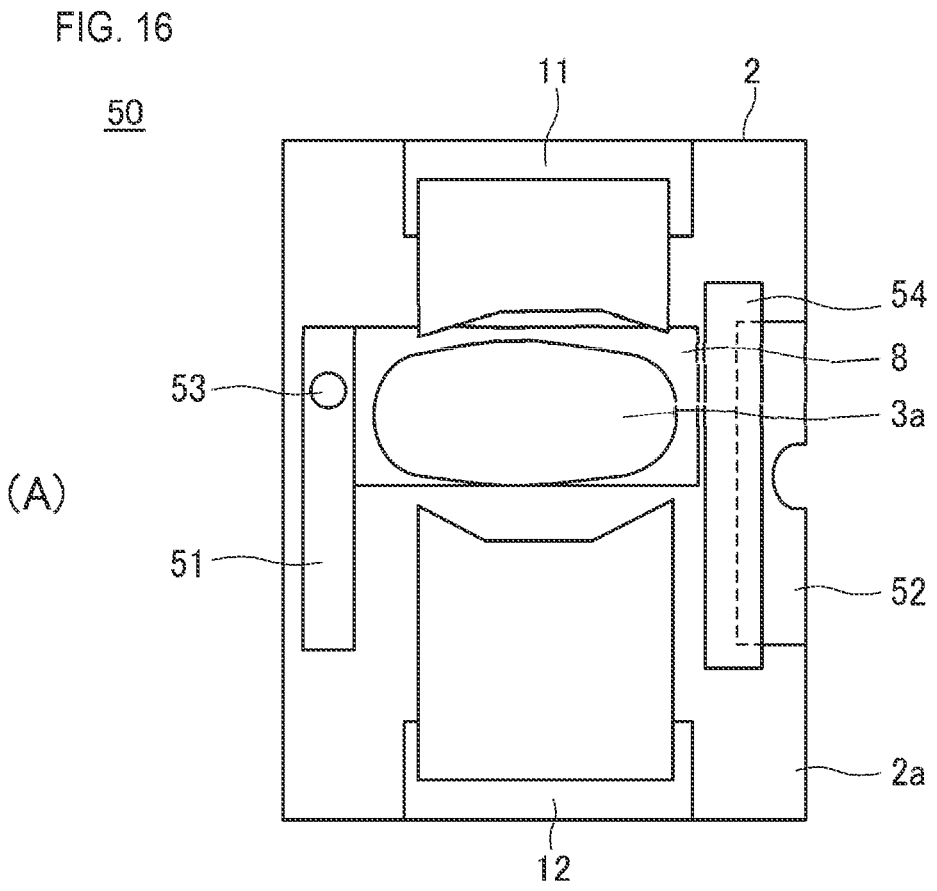
FIG. 16 illustrates the fuse element blown in the protection element according to Embodiment 4. (A) is a plan view, and (B) is a cross-sectional view.
Figure 16:
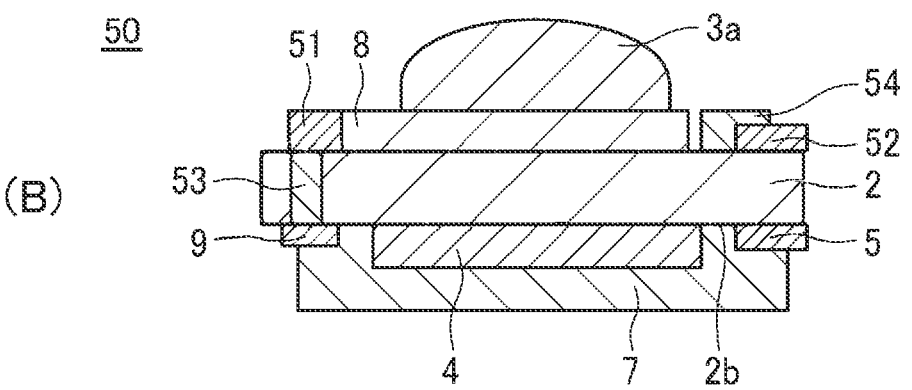

The heating element connecting electrode 9 and the first connecting electrode 51 are contiguous via a through hole 53 passing through the insulating substrate 2. The through hole 53 is a conductive through hole having a conductive layer formed therein, and the heating element connecting electrode 9 and the first connecting electrode 51 are electrically and thermally connected via the through hole 53. That is, in the protection element 50, the heating element 4 heats the intermediate electrode 8 via the insulating substrate 2, the heat from the heating element 4 is also transferred to the intermediate electrode 8 via the highly thermal conductive heating element connecting electrode 9, through hole 53, and first connecting electrode 51, and the fuse element 3 can be heated and blown out (FIG. 16).

An insulating restricting wall 54 is formed on the second connecting electrode 52. The restricting wall 54 prevents a fillet of a connecting solder which connects the heating element power supply electrode 5 to an external circuit board, from contacting the intermediate electrode 8 and the fuse element 3, when wet-spreading on the second connecting electrode 52. The restricting wall 54 can be formed, for example, by applying glass paste onto the second connecting electrode 52.

In the protection element 50, the intermediate electrode 8 overlaps with the second extraction electrode 10 via the insulating substrate 2. As a result, the intermediate electrode 8 and the second extraction electrode 10 are thermally connected via the insulating substrate 2, thereby assisting the heating of the intermediate electrode 8 and the fuse element 3 mounted thereon.

In addition, in the protection element 50, the intermediate electrode 8 overlaps with the first extraction electrode 6 via the insulating substrate 2. As a result, the intermediate electrode 8 and the first extraction electrode 6 are thermally connected via the insulating substrate 2 enabling assisting the heating of the intermediate electrode 8 and the fuse element 3 mounted thereon. In the protection element 50, the intermediate electrode 8 may be formed at a position that does not overlap with the first extraction electrode 6 via the insulating substrate 2. This makes formation of a discharge path between the first extraction electrode 6 which is a high-potential portion and the intermediate electrode 8 which is a low-potential portion difficult, thereby a spark is less likely to occur.

Embodiment 5

Next, Embodiment 5 wherein the protection element to which the present technology is applied is described. In the following description, the same reference codes may be given to the same configurations as those of the protection elements 1, 30, 40, and 50 described above, and the details thereof may be omitted. In contrast to the protection element 50, a protection element 60 according to Embodiment 5 is different in having a plurality of heating elements 4, first extraction electrodes 6, second extraction electrodes 10, and insulating layers 7 formed on the back surface 2b of the insulating substrate 2.

Figure 17:
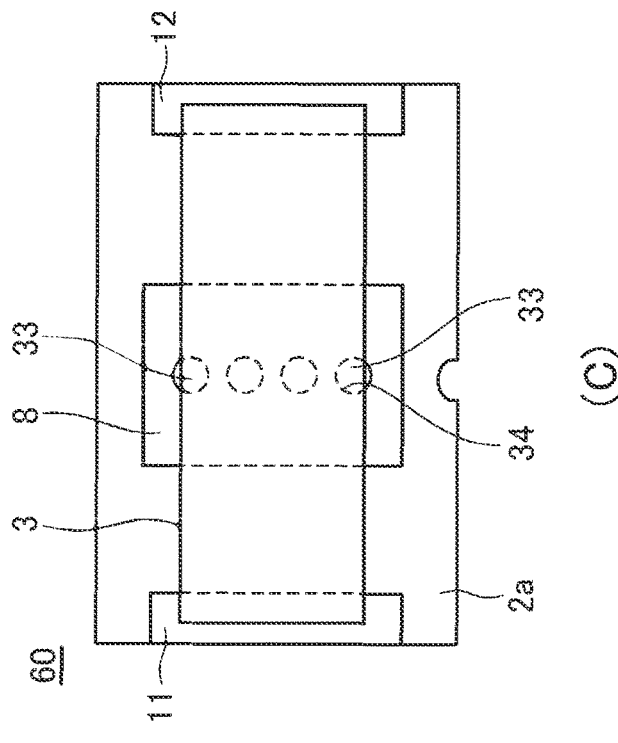
FIG. 17 illustrates Embodiment 5 of the protection element where the present technology is applied. (A) is a plan view, (B) is a cross-sectional view, and (C) is a bottom view.
Figure 17:
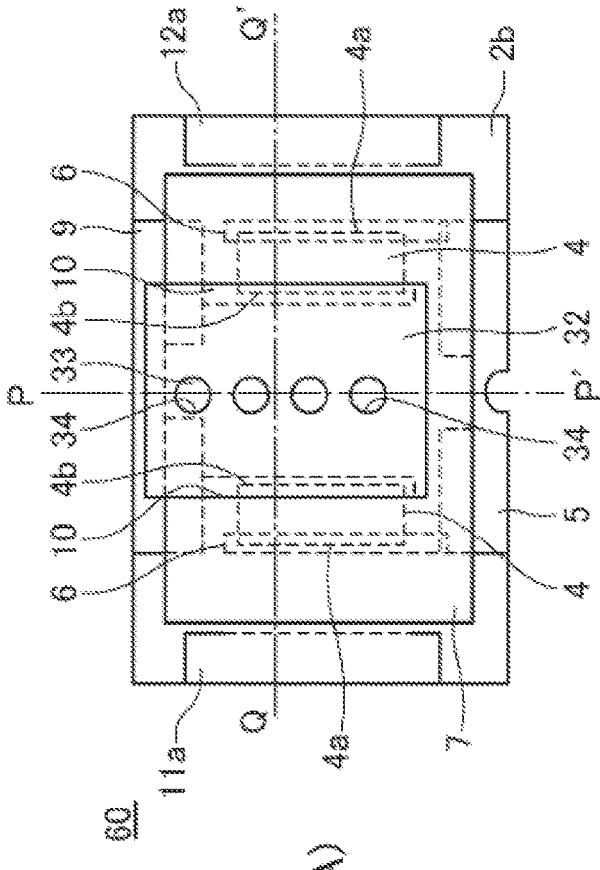
Figure 17:
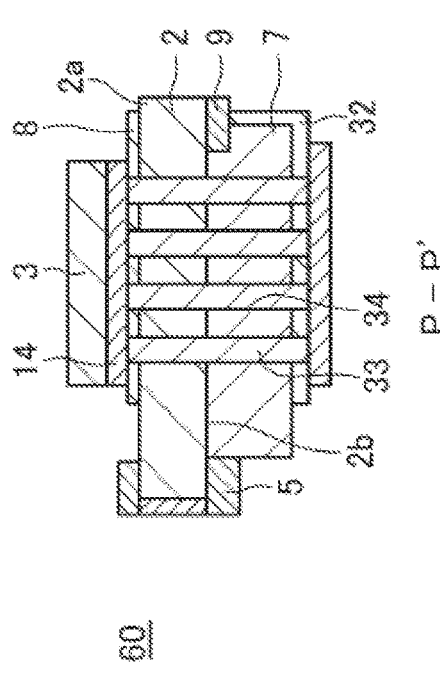
Figure 18:
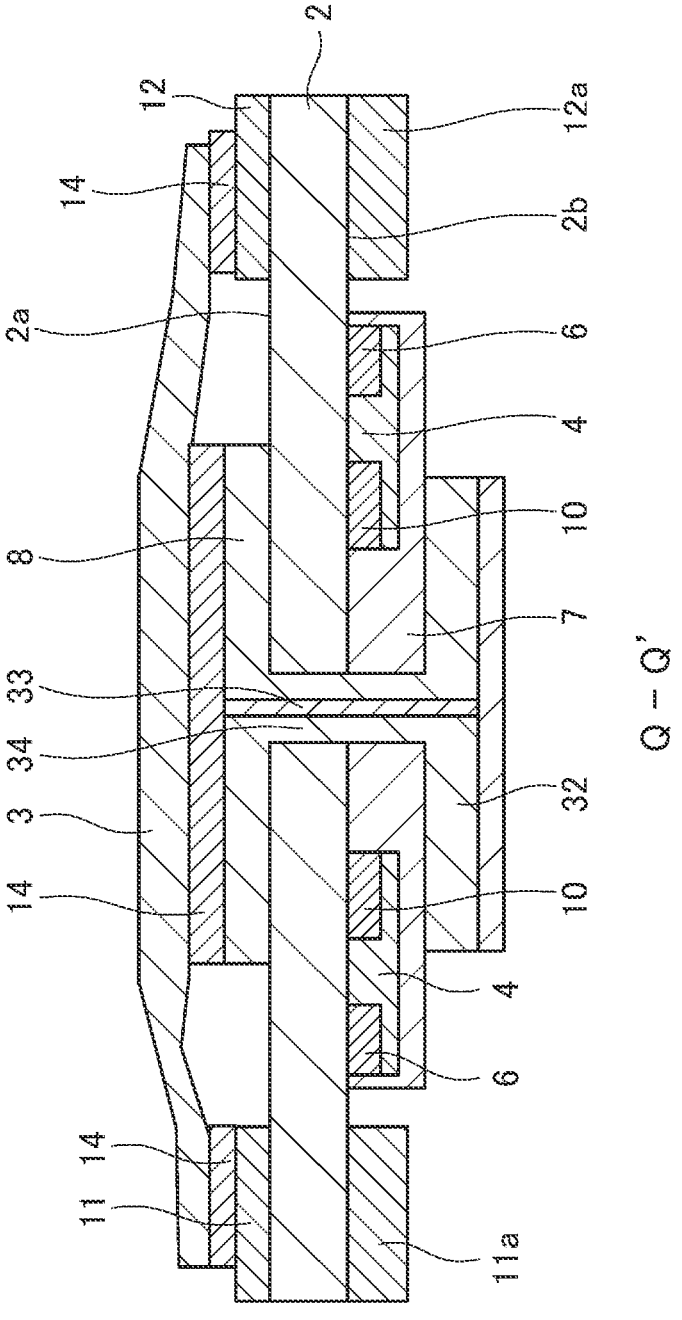
FIG. 18 is a cross-sectional view of the protection element according to Embodiment 5.
Figure 19:
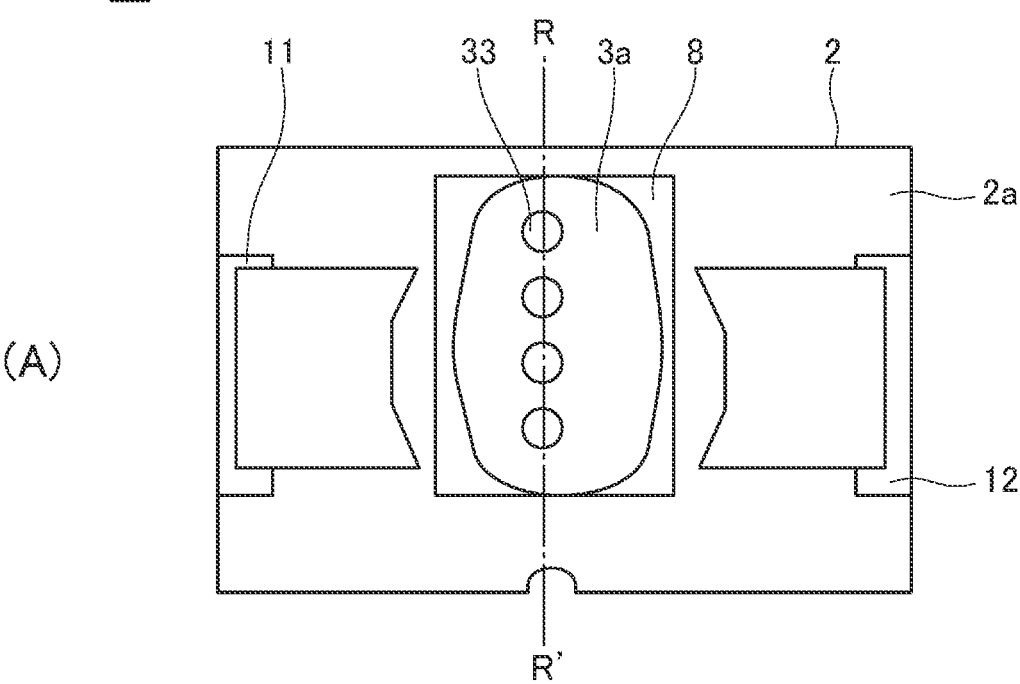
FIG. 19 illustrates the fuse element blown in the protection element according to Embodiment 5. (A) is a plan view, and (B) is a cross-sectional view.
Figure 19:
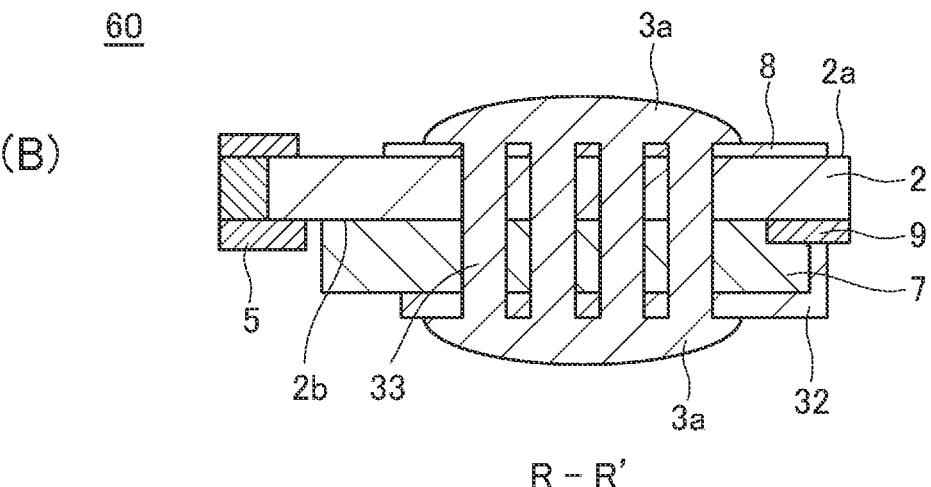

As illustrated in FIG. 17 (A) through (C), FIG. 18, and FIGS. 19 (A) and (B), the protection element 60 has a plurality of heating elements 4 arranged side by side on the back surface 2b of the insulating substrate 2 with a space therebetween. Each heating element 4 has the first end 4a connected to the heating element power supply electrode 5 via the first extraction electrode 6, and the second end 4b connected to the heating element connecting electrode 9 via the second extraction electrode 10. Each of the heating elements 4, each of the first extraction electrodes 6, and each of the second extraction electrodes 10 are covered with the insulating layers 7.

Retention Electrode

In addition, in the protection element 60, similar to in the protection element 30, a retention electrode 32 is formed on the back surface 2b of the insulating substrate 2 to retain the fused conductor 3a of the fuse element 3, and the intermediate electrode 8 formed on the front surface 2a and the retention electrode 32 are contiguous via the through hole 33 that passes through the insulating substrate 2, and the fused conductor 3a of the melted fuse element 3 is drawn to the retention electrode 32 side via the through hole 33. Thus, even if melt volume is increased by the size increase of a fuse element 3 due to higher rating and capacity of the protection element, a large volume of fused conductor 3a can be retained by the retention electrode 32, the intermediate electrode 8, and the first and second electrodes 11 and 12, guaranteeing the blowing of the fuse element 3.

The retention electrode 32 is formed so as to overlap with the insulating layer 7 provided on the back surface 2b of the insulating substrate 2. In addition, similar to the intermediate electrode 8, the retention electrode 32 can be formed by a known method such as printing using a known electrode material such as Ag, Cu, or an alloy material containing Ag or Cu as a main component.

The through hole 33 passes through the intermediate electrode 8, the insulating substrate 2, the insulating layer 7 and the retention electrode 32. In addition, a conductive layer 34 is formed on the inner surface of the through hole 33. The conductive layer 34 is contiguous with the intermediate electrode 8 and the retention electrode 32. As a result, the fused conductor 3a aggregated on the intermediate electrode 8 can be readily guided into the through hole 33, and also the fused conductor 3a drawn via the through hole 33 can be aggregated on the retention electrode 32, and by drawing more of the fused conductor 3a, the volume of the fused conductor 3a retained by the intermediate electrode 8 and the first and second electrodes 11 and 12 at the blown out portion of the fuse element 3 can be reduced.

In the protection element 60, by connecting the conductive layer 34 formed in the through hole 33 of the retention electrode 32 to the intermediate electrode 8, a power supply path is configured from the heating element power supply electrode 5, through the retention electrode 32 and the fuse element 3, reaching a first electrode 11 and to the heating element 4. In addition, in the protection element 60, by connecting the conductive layer 34 formed in the through hole 33 of the retention electrode 32 to the intermediate electrode 8, a thermal path transmitting the heat from the heating element 4 through the conductive layer 34 and the intermediate electrode 8 to the fuse element 3 is configured.

Also, a plurality of through holes 33 may be formed in the protection element 60 to increase the number of paths for drawing the fused conductor 3a of the fuse element 3, and by drawing more of the fused conductor 3a, the volume of the fused conductor 3a at the blown out portion can be reduced.

In each of the heating elements 4, when the power is applied via the heating element power supply electrode 5, the heating element power supply electrode 5 and the first extraction electrode 6 side is the high-potential portion, and the second extraction electrode 10, the heating element connecting electrode 9, and the intermediate electrode 8 side is the low-potential portion. Furthermore, for the protection element 60, the intermediate electrode 8 does not overlap with each of the first extraction electrodes 6, but overlaps with each of the second extraction electrodes 10 in plan view.

Thus, with the protection element 60, the intermediate electrode 8 is formed at a position separated from each of the first extraction electrodes 6 in plan view, so formation of a discharge path between the first extraction electrodes 6 which are the high-potential portion and the intermediate electrode 8 which is the low-potential portion does not readily occur, thereby a spark (discharge) is less likely to occur, and the electric current path can be cut off safely and quickly.

Furthermore, with the protection element 60, the intermediate electrode 8 overlaps each of the second extraction electrodes 10, so that the intermediate electrode 8 and the second extraction electrodes 10 are thermally connected via the insulating substrate 2, resulting in enabling the intermediate electrode 8 and the fuse element 3 mounted thereon to be efficiently heated. Therefore, the fuse element 3 can be blown quickly after electric current is applied to each of the heating elements 4.

In the protection element 60, the retention electrode 32 located on the downstream side of the electric current flow direction of the heating element 4 overlaps with the second extraction electrode 10 and does not overlap with the first extraction electrode 6, and thereby is formed at a position separated from the first extraction electrode 6 which is the high-potential portion, thus, a spark (discharge) is less likely to occur even when a high voltage is applied, and damage due to a spark can be prevented.

In addition, the protection element 60 having the heating elements 4 formed on both sides of the through hole 33 in order to heat the retention electrode 32 and the intermediate electrode 8 and to aggregate and draw more fused conductor 3a is preferable.

Embodiment 6

Figure 20:
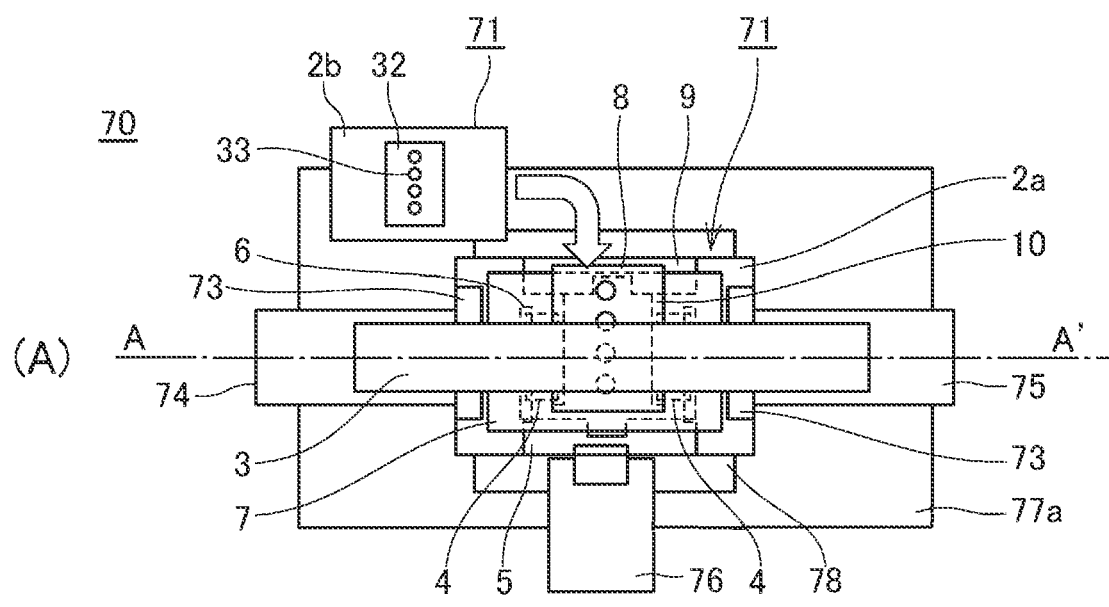
FIG. 20 illustrates Embodiment 6 of the protection element where the present technology is applied. (A) is a plan view, and (B) is a cross-sectional view.
Figure 20:
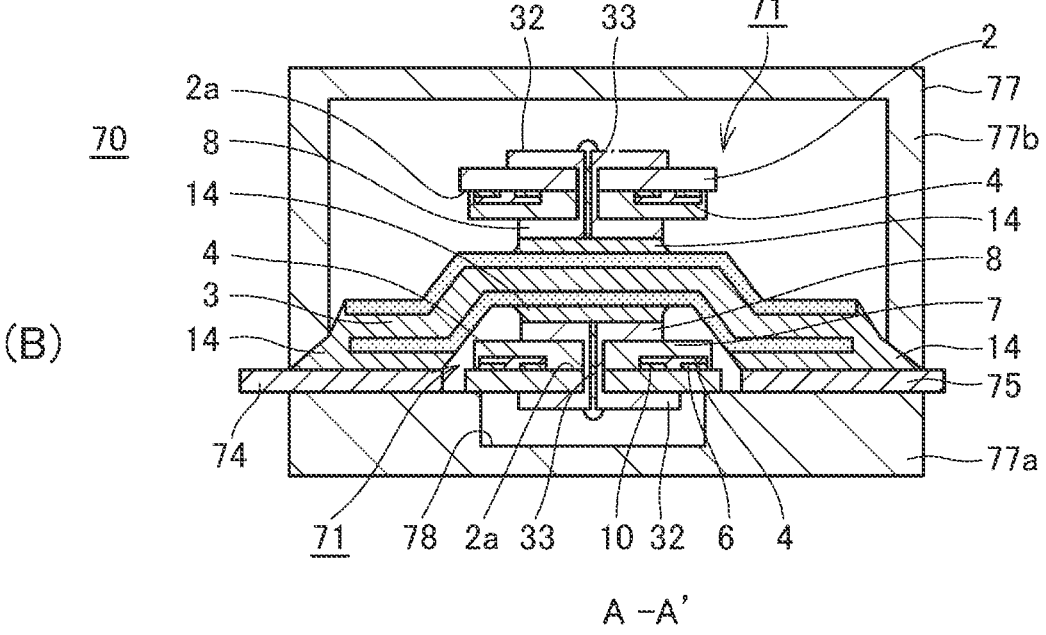

Next, Embodiment 6 wherein the protection element to which the present technology is applied is described. In the following description, the same reference codes may be given to the same configurations as those of the protection element 1, 30, 40, 50 and 60 described above, and the details thereof may be omitted. As illustrated in FIGS. 20 (A) and (B), a protection element 70 according to Embodiment 6 has the heating element 4 and the intermediate electrode 8 formed on the front surface 2a of the insulating substrate 2 and the retention electrode 32 on the back surface 2b of the insulating substrate 2, thereby constituting a blow member 71 allowing the insulating substrate 2 to draw and retain the fused conductor 3a of the fuse element 3 from the intermediate electrode 8 through the through hole 33 to the retention electrode 32 side, and the fuse element 3 is sandwiched by this blow member 71.

The insulating substrate 2 of the blow member 71 has, on the surface 2a, a plurality of heating elements 4, a heating element power supply electrode 5 as a power supply terminal for each of the heating elements 4, a plurality of first extraction electrodes 6 led from the heating element power supply electrode 5 and connected to the first end 4a of each of the heating elements 4, the insulating layer 7 covering the heating element 4, the intermediate electrode 8 formed on the insulating layer 7 and connected to the fuse element 3, the heating element connecting electrode 9 formed between each of the heating elements 4 and the intermediate electrode 8 on the front surface 2a of the insulating substrate 2 and connecting each of the heating elements 4 and the intermediate electrode 8, and the second extraction electrode 10 led from the heating element connecting electrode 9 and connected to the second end 4b of each of the heating elements 4. Since the configuration and effect of electrodes 5, 6, 8, 9, 10, the heating element 4, and the insulating layer 7 are the same as the protection element 30 thereof described above, the details are omitted.

The insulating substrate 2 of the blow member 71 has the retention electrode 32 formed on the back surface 2b for retaining the fused conductor 3a of the fuse element 3, and the intermediate electrode 8 and the retention electrode 32 are contiguous via the through hole 33 with a conductive layer 34 formed on the inner surface and passing through the insulating substrate 2. As a result, the insulating substrate 2 draws the fused conductor 3a of the blown fuse element 3 from the intermediate electrode 8 to the retention electrode 32 side via the through hole 33. The configuration and effect of the retention electrode 32, the through hole 33, and the conductive layer 34 are the same as that of the protection element 30 thereof described above, so details are omitted.

Here, the insulating substrate 2 of the blow member 71 may be provided with an auxiliary electrode 73 on the front surface 2a, which is connected to the fuse element 3 and retains the fused conductor 3a, together with the intermediate electrode 8. In addition, the fuse element 3 is provided separately from the insulating substrate 2, and is connected using a bonding material such as a connecting solder 14 to the first and second external terminals 74 and 75 which are connected to an external circuit. In other words, the first and second external terminals 74, 75 are electrically connected via the fuse element 3. Similarly, the heating element power supply electrode 5 of each of the blow members 71 is also provided separately from the insulating substrate 2 and connected to a third external terminal 76 which is connected to an external circuit.

Note, in the protection element 70, the blow member 71, the fuse element 3, and the first through third external terminals 74 through 76 are stowed in an insulating case 77. The case 77 has a lower case 77a in which the blow member 71 connected to the lower side of the fuse element 3 and the first through third external terminals 74 through 76 are arranged, and a cover 77b which covers the lower case 77a. The lower case 77a has a storage recess 78 having a size sufficient for the retention electrode 32 of the arranged blow member 71 to retain the fused conductor 3a. In addition, the cover 77b stows the blow member 71 connected to the upper side of the fuse element 3, and has sufficient internal space for the retention electrode 32 of this blow member 71 to retain the fused conductor 3a.

A first end of each of the first and second external terminals 74, 75 is connected to the fuse element 3 inside the case 77, and the second end is led out of the case 77 and connected to the external circuit. A first end of the third external terminal 76 is connected to the heating element power supply electrode 5 of each of the blow members 71 inside the case 77, and the second end is led out of the case 77 and connected to the external circuit.

Figure 21:
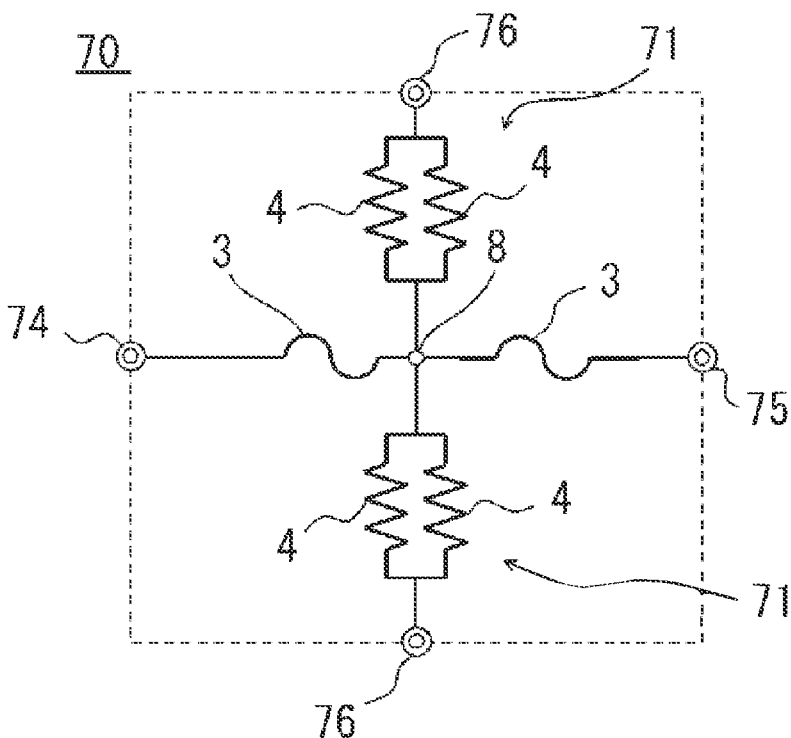
FIG. 21 is a circuit diagram of the protection element according to Embodiment 6.

In the protection element 70, as illustrated in FIG. 20, the fuse element 3 is sandwiched by a plurality of blow members 71. In the protection element 70 illustrated in FIG. 20, the blow members 71 are arranged on a first surface and a second surface of the fuse element 3, respectively. FIG. 21 is a circuit diagram of the protection element 70. In each of the blow members 71 arranged on the front surface and the back surface of the fuse element 3, the first end of the heating element 4 is connected to a power source for the heating element 4 to generate heat via the first extraction electrode 6, the heating element power supply electrode 5, and the third external terminal 76 formed on each of the insulating substrates 2, and the second end of the heating element 4 is connected to the fuse element 3 via the second extraction electrode 10, the heating element connecting electrode 9, and the intermediate electrode 8 formed on each of the insulating substrates 2.

Figure 22:
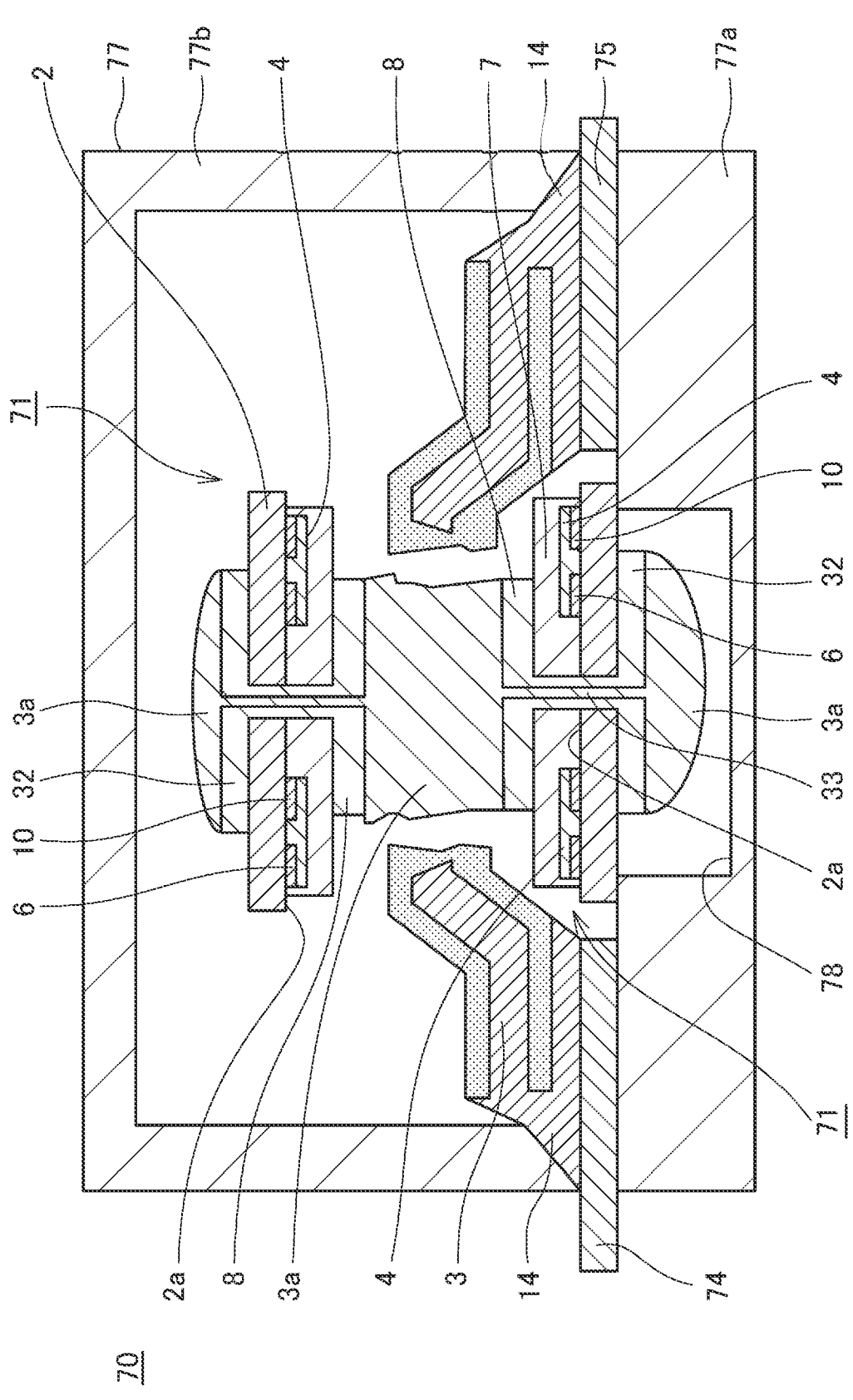
FIG. 22 is a cross-sectional view illustrating the fuse element blown in the protection element according to Embodiment 6.

As illustrated in FIG. 22, in the protection element 70, when blowing the fuse element 3 by heat from the heating element 4, the heating element 4 of each of the blow members 71, 71 connected to both surfaces of the fuse element 3 generates heat to heat the fuse element 3 from both surfaces. Therefore, even when the cross-sectional area of the fuse element 3 is increased for high-current applications, the protection element 70 can quickly heat and blow out the fuse element 3.

In addition, in the protection element 70, the fused conductor 3a of the fuse element 3 is drawn into the through hole 33 formed on the insulating substrate 2 of the blow member 71 and aggregated on the retention electrode 32. Therefore, even in cases where the cross-sectional area of the fuse element is increased for compatibility with large current applications where fused conductor 3a exceeding the intermediate electrode 8 retention capacity of fused conductor 3a is generated, by retaining the fused conductor 3a by the through hole 33 and retention electrode 32, in addition to the intermediate electrode 8, and by drawing the fused conductor 3a with a plurality of blow members 71, the protection element 70 can reliably cause the fuse element 3 to blow. In addition, the protection element 70 can blow the fuse element 3 more quickly by drawing the fused conductor 3a by means of the plurality of blow members 71.

The protection element 70 can quickly blow out the fuse element 3 even when the fuse element 3 has a covered structure in which a low melting point metal constituting an inner layer is covered with a high melting point metal. In other words, the fuse element 3 covered with the high melting point metal takes time to heat up to a temperature at which the outer layer of the high melting point metal melts even when the heating element 4 generates heat. Here, the protection element 70 includes a plurality of blow members 71, and heats each of the heating elements 4 at the same time, so that the high melting point metal of the outer layer can be quickly heated to the melt temperature. Therefore, according to the protection element 70, the thickness of the high melting point metal layer that constitutes an outer layer can be increased, and the rapid blowout characteristics can be maintained while further increasing the rating.

Moreover, as illustrated in FIG. 20, the protection element 70 is preferably connected to the fuse element 3 with a pair of blow members 71, 71 facing each other. As a result, the protection element 70 can simultaneously heat the same portion of the fuse element 3 from both sides by the pair of blow members 71, 71 and draw the fused conductor 3a, thereby heating and blowing the fuse element 3 more quickly.

In the protection element 70, the intermediate electrode 8 and the auxiliary electrode 73 formed on each of the insulating substrates 2 of the pair of blow members 71, 71 are preferably formed opposite from each other with the fuse element 3 interposed therebetween. As a result, the pair of blow members 71, 71 are symmetrically connected, so that the load applied to the fuse element 3 does not become unbalanced during reflow mounting, and the like, and resistance to deformation can be improved.

Embodiment 7

Figure 23:
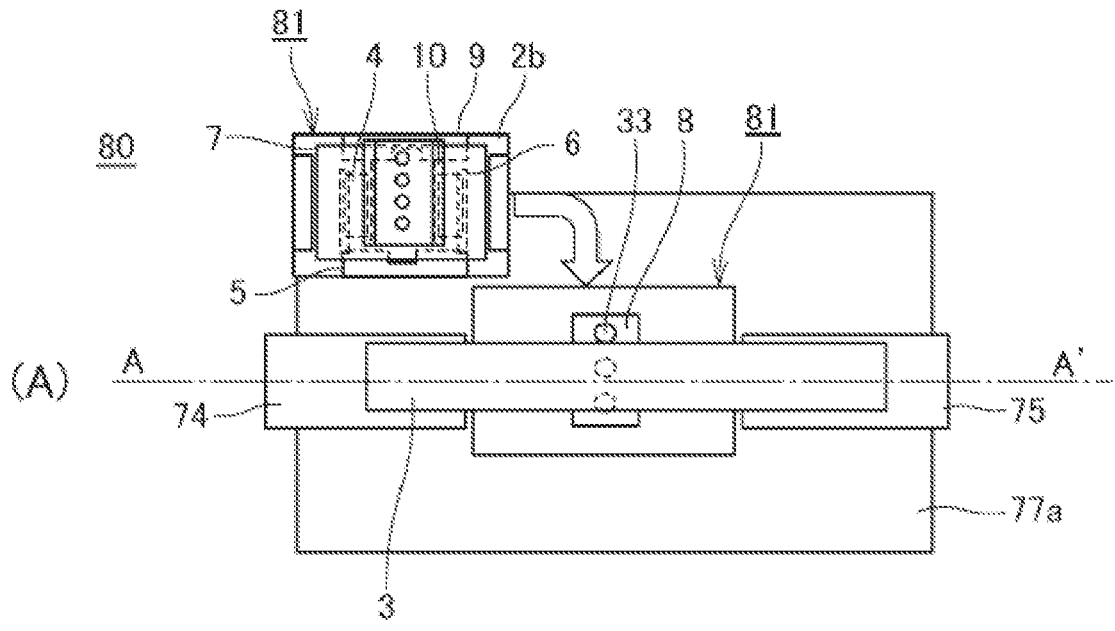
FIG. 23 illustrates Embodiment 7 of the protection element where the present technology is applied. (A) is a plan view, and (B) is a cross-sectional view.
Figure 23:
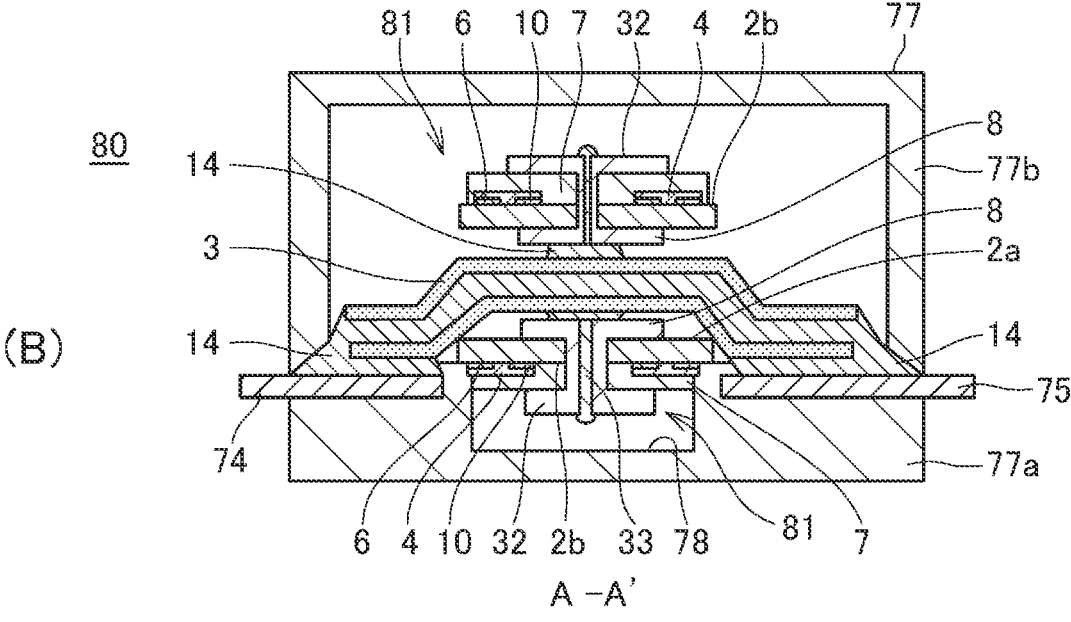
Figure 24:
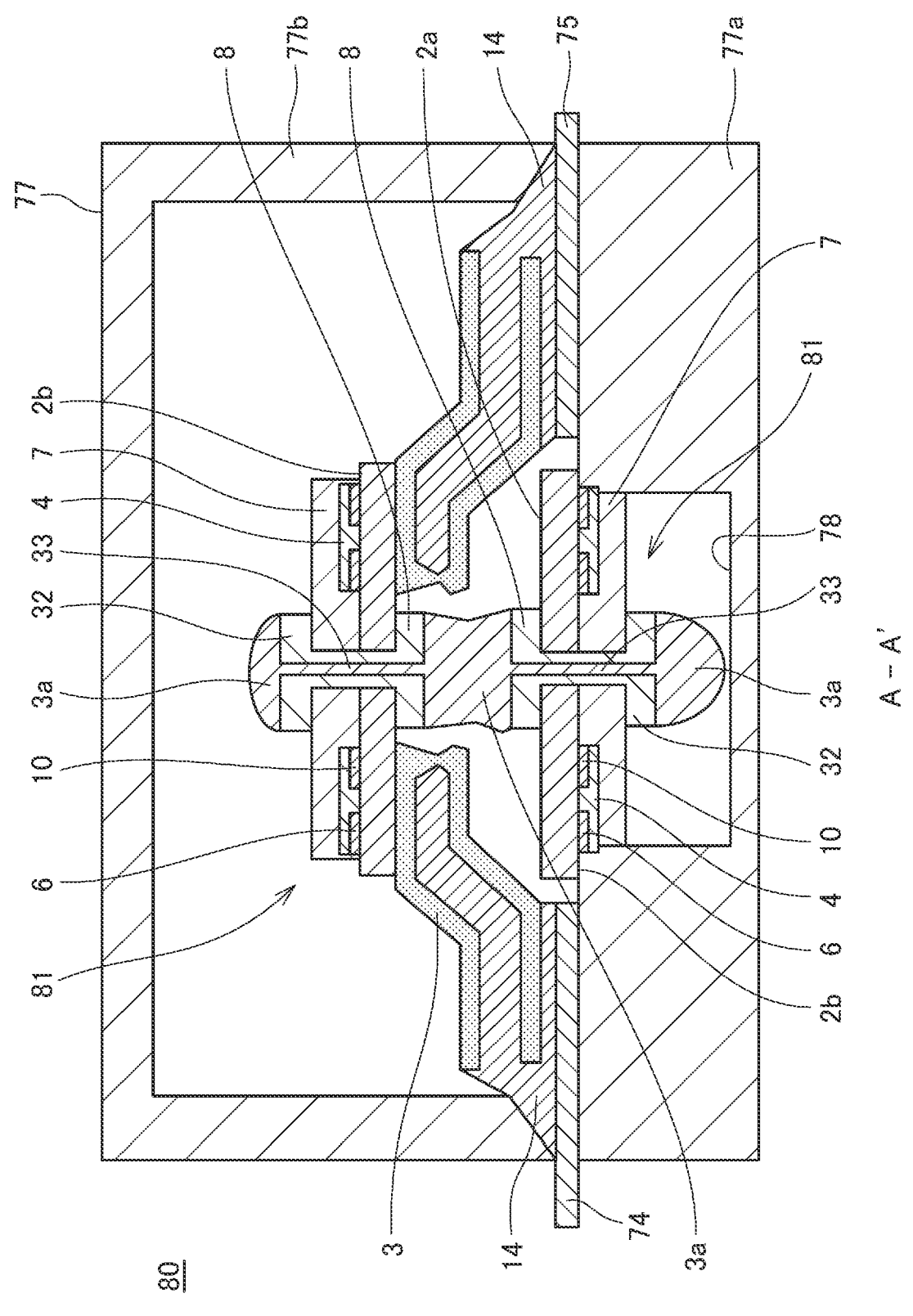
FIG. 24 is a cross-sectional view illustrating the fuse element blown in the protection element according to Embodiment 7.

Next, Embodiment 7 wherein the protection element to which the present technology is applied is described. In the following description, the same reference codes may be given to the same configurations as those of the protection elements 1, 30, 40, 50, 60, and 70 described above, and the details thereof may be omitted. As illustrated in FIGS. 23 (A) and (B) and FIG. 24, a protection element 80 according to Embodiment 7 has the intermediate electrode 8 formed on the front surface 2a of the insulating substrate 2, and the heating element 4 and the retention electrode 32 on the back surface 2b of the insulating substrate 2, thereby constituting a blow member 81 allowing the insulating substrate 2 to draw and hold a fused conductor 3a of a fuse element 3 from the intermediate electrode 8 via a through hole 33 to a retention electrode 32 side, and the fuse element 3 is interposed by this blow member 81.

The insulating substrate 2 of the blow member 81 has an intermediate electrode 8 formed on the front surface 2a to be connected to the fuse element 3. Since the configuration and effect of this intermediate electrode 8 are the same as those of the protection element 60 described above, details thereof are omitted. Here, the blow member 81 may also be provided with the auxiliary electrode 73 together with the intermediate electrode 8 on the front surface 2a of the insulating substrate 2, which is connected to the fuse element 3 and retains the fused conductor 3a.

The insulating substrate 2 of the blow member 81 has, on the back surface 2b, a plurality of heating elements 4, the heating element power supply electrode 5 as a power supply terminal for each of the heating elements 4, a plurality of first extraction electrodes 6 led from the heating element power supply electrode 5 and connected to the first end 4a of each of the heating elements 4, the insulating layer 7 covering the heating elements 4, the heating element connecting electrode 9 formed between each of the heating elements 4 and the intermediate electrode 8 on the front surface 2a of the insulating substrate 2 and connecting each of the heating elements 4 and the intermediate electrode 8, the second extraction electrode 10 led from the heating element connecting electrode 9 and connected to the second end 4b of each of the heating elements 4, and the retention electrode 32 retaining the fused conductor 3a of the fuse element 3 formed on the insulating layer 7, and the intermediate electrode 8 and the retention electrode 32 are contiguous via the through hole 33 passing through the insulating substrate 2 and formed with a conductive layer 34 on the inner surface thereof. As a result, the insulating substrate 2 draws the fused conductor 3a of the blown fuse element 3 from the intermediate electrode 8 to the retention electrode 32 side via the through hole 33, and also constitutes the electric conduction path of the heating element 4 and the thermal path to the fuse element 3. Since the configuration and effect of each of electrodes 5, 6, 9, 10, the heating element 4, the insulating layer 7, the retention electrode 32, the through hole 33, and the conductive layer 34 are the same as the protection element 60 thereof described above, the details are omitted.

Similar to the protection element 70, the fuse element 3 is connected to first and second external terminals 74 and 75 connected to an external circuit by a connecting material such as connecting solder 14. In addition, the heating element power supply electrode 5 of each of the blow members 81 is also connected to the third external terminal 76 connected to an external circuit.

The action of energizing the heating element 4 and blowing the fuse element 3 in the protection element 80 is the same as the protection element 70 thereof described above, so the details are omitted.

In the protection elements 70 and 80, whether forming on the front surface 2*a* or the back surface 2*b* of the insulating substrate 2, forming the heating element 4 on both sides of the through hole 33 is preferable for heating the retention electrode 32 and the intermediate electrode 8 and drawing and aggregating even more of the fused conductor 3*a*.

Figure 25:
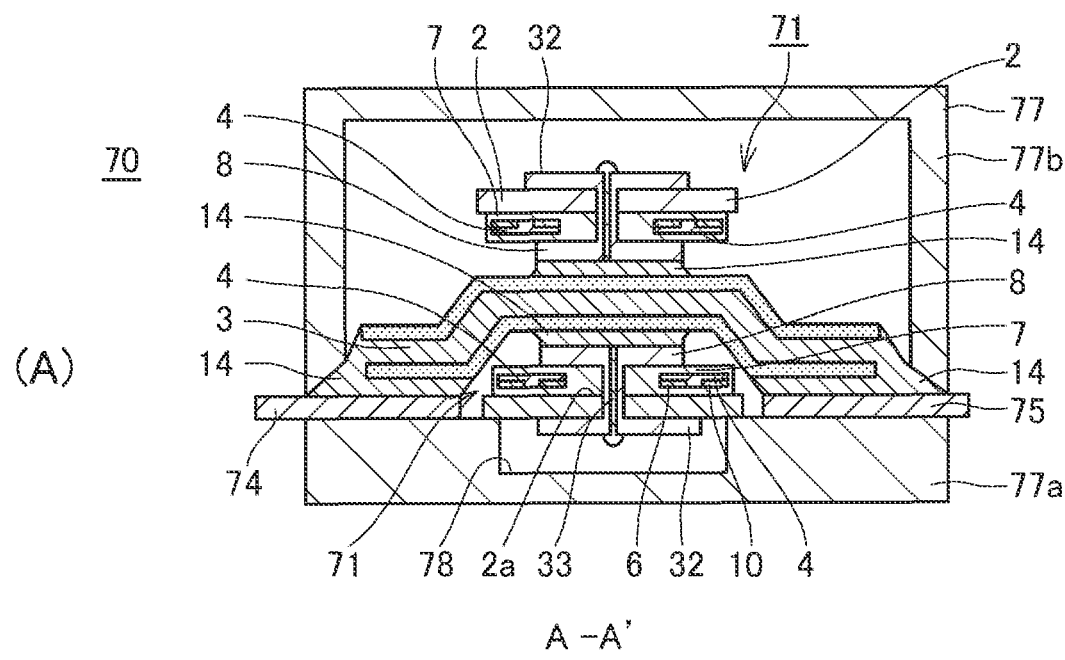
FIG. 25 illustrates a modified example of the protection element according to Embodiment 6. (A) is a cross-sectional view illustrating before the fuse element is blown, and (B) is a cross-sectional view illustrating after the fuse element is blown.
Figure 25:
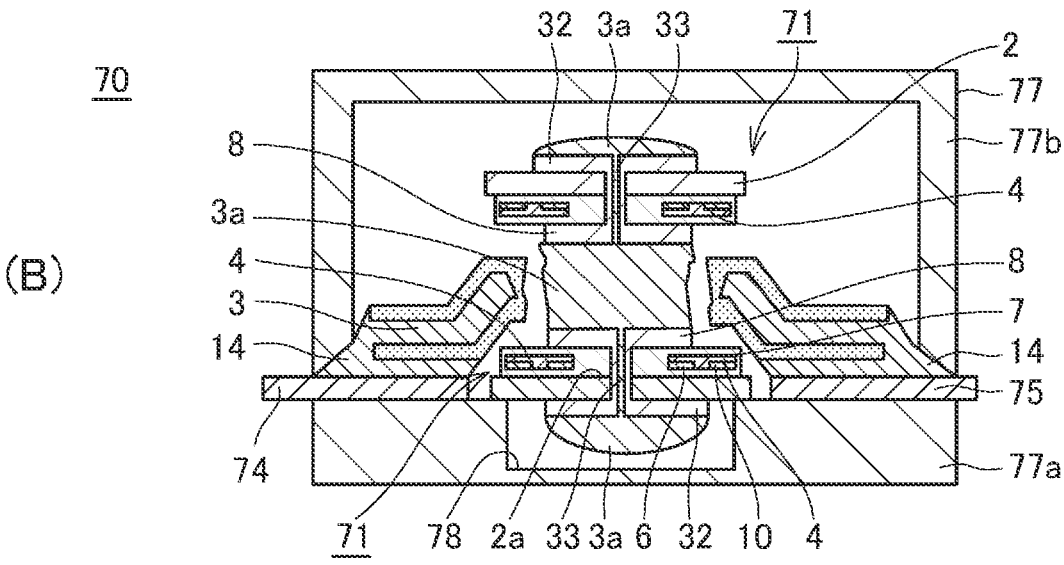
Figure 26:
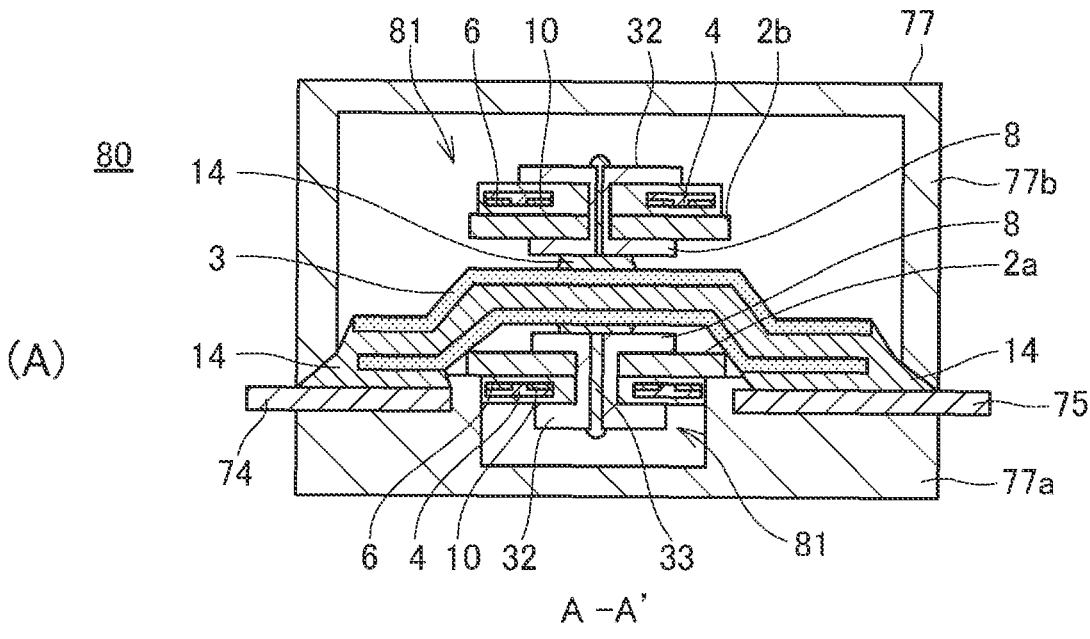
FIG. 26 illustrates a modified example of the protection element according to Embodiment 7. (A) is a cross-sectional view illustrating before the fuse element is blown, and (B) is a cross-sectional view illustrating after the fuse element is blown.
Figure 26:
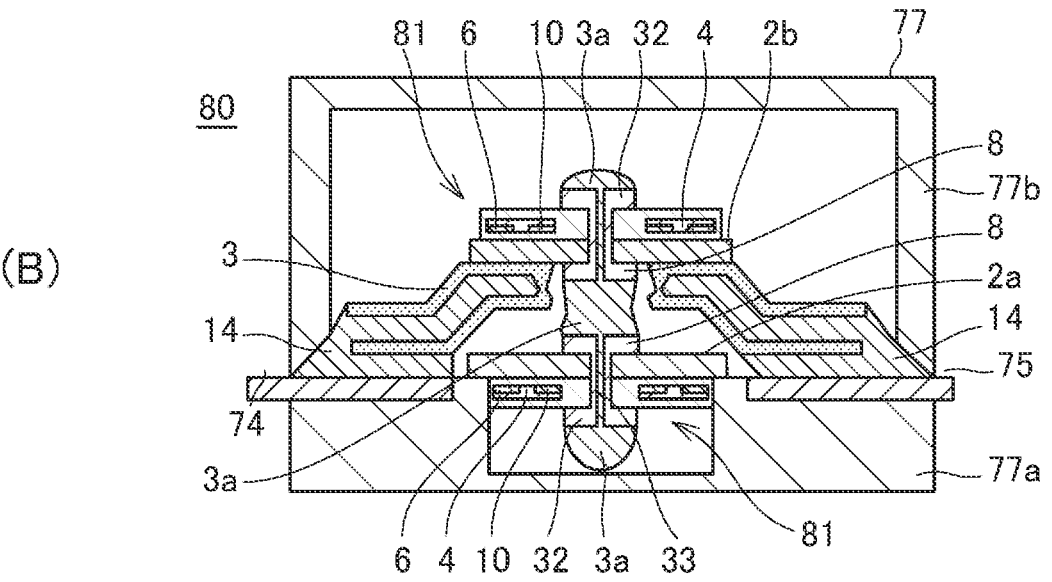

In addition, as illustrated in FIGS. 25 (A) and (B), and FIGS. 26 (A) and (B), for the protection element 70 and 80, after forming the insulating layer 7 on the front surface 2*a* or the back surface 2*b* of the insulating substrate 2, the heating element power supply electrode 5, the first extraction electrode 6, the second extraction electrode 10, the heating element connecting electrode 9, and the heating element 4 may be formed, and by further forming the insulating layer 7 thereon, the heating element 4, and the like may be formed within the insulating layer 7.

REFERENCE SIGNS LIST

1. Protection element, 2. Insulating substrate, 2*a*. Front surface, 2*b*. Back surface, 3. Fuse element, 3*a*. Fused conductor, 4. Heating element, 4*a*. First end, 4*b*. Second end, 5. Heating element power supply electrode, 5*a*. Third external connection electrode, 6. First extraction electrode, 7. Insulating layer, 8. Intermediate electrode, 9. Heating element connecting electrode, 10. Second extraction electrode, 11. First electrode, 11*a*. First external connection electrode, 12. Second electrode, 12*a*. Second external connection electrode, 14. Connecting solder, 15. Low melting point metal layer, 16. High melting point metal layer, 17. Restricting wall, 20. Battery pack, 20*a*. Positive terminal, 20*b*. Negative terminal, 21*a*. through 21*d*. Battery cells, 22. Charging device, 23. Current control element, 24. Controller, 25. Battery stack, 26. Charge/discharge control circuit, 27. Detecting circuit, 28. Current control element, 30. Protection element, 32. Retention electrode, 33. Through hole, 34. Conductive layer, 40. Protection element, 50. Protection element, 51. First connecting electrode, 52. Second connecting electrode, 53. Through hole, 54. Restricting wall, 60. Protection element, 70. Protection element, 71. Blow member, 73. Auxiliary electrode, 74. First external terminal, 75. Second external terminal, 76. Third external terminal, 77. Case, 77*a*. Lower case, 77*b*. Cover, 80. Protection element, 81. Blow member

The invention claimed is:

1. A protection element, comprising:
an insulating substrate;
a fuse element provided on a first surface of the insulating substrate;
a heating element provided on the first surface of the insulating substrate, to blow the fuse element by generating heat;
a heating element power supply electrode provided on the first surface of the insulating substrate, to supply current to the heating element for heat generation;
a first extraction electrode leading from the heating element power supply electrode and connected to a first end of the heating element;
an intermediate electrode connected to the fuse element;
a heating element connecting electrode provided on the first surface of the insulating substrate between the heating element and the intermediate electrode, connecting the heating element and the intermediate electrode;
a second extraction electrode leading from the heating element connection electrode and connected to a second end of the heating element;
an insulating layer that covers the heating element, the first extraction electrode, and the second extraction electrode, and on which the intermediate electrode is laminated; and
a retention electrode provided on a second surface on an opposite side of the first surface of the insulating substrate, to retain a fused conductor of the fuse element, wherein
the intermediate electrode does not overlap with the first extraction electrode and overlaps with the second extraction electrode with the insulating layer interposed therebetween,
the heating element, the first extraction electrode, and the second extraction electrode are provided on both sides of the intermediate electrode,
the intermediate electrode and retention electrode are connected via a through hole passing through the insulating substrate,
the insulating substrate constitutes a blow member that draws the fused conductor of the melted fuse element to a retention electrode side via the through hole, and
the fuse element is sandwiched in the blow member.
2. A protection element, comprising:
an insulating substrate;
a fuse element provided on a first surface of the insulating substrate;
a heating element provided on the first surface of the insulating substrate, to blow the fuse element by generating heat;
a heating element power supply electrode provided on the first surface of the insulating substrate, to supply current to the heating element for heat generation;
a first extraction electrode leading from the heating element power supply electrode and connected to a first end of the heating element;
an intermediate electrode connected to the fuse element;
a heating element connecting electrode provided on the first surface of the insulating substrate between the heating element and the intermediate electrode, connecting the heating element and the intermediate electrode;
a second extraction electrode leading from the heating element connection electrode and connected to a second end of the heating element; and
an insulating layer that covers the heating element, the first extraction electrode, and the second extraction electrode, and on which the intermediate electrode is laminated, wherein the first extraction electrode, the heating element, the second extraction electrode, and the intermediate electrode are arranged in order in plan view.

3. The protection element according to claim 2, wherein the second extraction electrode and the intermediate electrode do not overlap in plan view.

4. A protection element, comprising an insulating substrate;

a fuse element provided on a first surface of the insulating substrate;

a heating element provided on a second surface on an opposite side of the first surface of the insulating substrate, to blow the fuse element by generating heat;

a heating element power supply electrode provided on the second surface of the insulating substrate, to supply current to the heating element for heat generation;

a first extraction electrode leading from the heating element power supply electrode and connected to a first end of the heating element;

an intermediate electrode provided on the first surface of the insulating substrate, on which the fuse element is arranged;

a heating element connecting electrode provided on the second surface of the insulating substrate between the heating element and the intermediate electrode, connecting the heating element and the intermediate electrode;

a second extraction electrode leading from the heating element connection electrode and connected to a second end of the heating element; and an insulating layer covering the heating element, the first extraction electrode, and the second extraction electrode; wherein the intermediate electrode overlaps with the second extraction electrode and optionally with the first extraction electrode, with the insulating substrate interposed therebetween, and the intermediate electrode overlaps with the first extraction electrode.

5. The protection element according to claim 4, wherein the intermediate electrode does not overlap with the first extraction electrode.

6. The protection element according to claim 4, wherein the heating element, the first extraction electrode, and the second extraction electrode are provided on both sides of the intermediate electrode.

7. The protection element according to claim 6, further comprising a retention electrode provided on the insulating layer, to retain a fused conductor of the fuse element, wherein the intermediate electrode and retention electrode are connected via a through hole passing through the insulating substrate.

8. The protection element according to claim 7, wherein the insulating substrate constitutes a blow member that draws the fused conductor of the melted fuse element to a retention electrode side via the through hole, and the fuse element is sandwiched in the blow member.

9. A battery pack, comprising:

one or more battery cells;

the protection element according to claim 1, connected on a charging/discharging path of the battery cell, to cut off the charging/discharging path; and a current control element to detect the battery cell voltage value and control energization of the protection element.

10. A battery pack, comprising:

one or more battery cells;

the protection element according to claim 2, connected on a charging/discharging path of the battery cell, to cut off the charging/discharging path; and a current control element that to detect the battery cell voltage value and control energization of the protection element.

11. A battery pack, comprising:

one or more battery cells;

the protection element according to claim 4, connected on a charging/discharging path of the battery cell, to cut off the charging/discharging path;

a current control element to detect the battery cell voltage value and control energization of the protection element.

12. The protection element according to claim 2, wherein the heating element, the first extraction electrode, and the second extraction electrode are provided on both sides of the intermediate electrode.

13. The protection element according to claim 12, further comprising a retention electrode provided on a second surface on an opposite side of the first surface of the insulating substrate, to retain a fused conductor of the fuse element, wherein the intermediate electrode and retention electrode are connected via a through hole passing through the insulating substrate.

14. The protection element according to claim 13, wherein the insulating substrate constitutes a blow member that draws the fused conductor of the melted fuse element to a retention electrode side via the through hole, and the fuse element is sandwiched in the blow member.

* * * * *